(12) United States Patent
Naim et al.

(10) Patent No.: US 10,846,879 B2
(45) Date of Patent: Nov. 24, 2020

(54) SELECTIVE MAPPING OF CODED MULTI-CHANNEL TRANSMISSION

(71) Applicants: Muhammad Ahsan Naim, South Jordan, UT (US); John P. Fonseka, Plano, TX (US)

(72) Inventors: Muhammad Ahsan Naim, South Jordan, UT (US); John P. Fonseka, Plano, TX (US)

(*) Notice: Subject to any disclaimer, the term of this patent is extended or adjusted under 35 U.S.C. 154(b) by 0 days.

(21) Appl. No.: 16/708,037

(22) Filed: Dec. 9, 2019

(65) Prior Publication Data
US 2020/0184677 A1  Jun. 11, 2020

Related U.S. Application Data

(63) Continuation of application No. 16/298,740, filed on Mar. 11, 2019, now Pat. No. 10,504,238, which is a
(Continued)

(51) Int. Cl.
*H04L 5/00* (2006.01)
*G06T 7/73* (2017.01)
(Continued)

(52) U.S. Cl.
CPC .............. *G06T 7/74* (2017.01); *H04L 1/0041* (2013.01); *H04L 1/0045* (2013.01); *H04L 5/0044* (2013.01); *H04L 5/0046* (2013.01); *H04L 5/0092* (2013.01); *H04L 27/2602* (2013.01); *H04L 27/3483* (2013.01);
(Continued)

(58) Field of Classification Search
CPC ... H04L 1/0041; H04L 5/0007; H04L 1/0061; H04L 25/03343; H04L 1/0075; H04L 5/0057; H04L 25/0204; H04L 1/0003; H04L 1/0065; H04L 1/0068; H04L 1/1867; H04L 27/2647; H04L 1/1861; H04L 2025/03426; H04L 27/3405; H04L 5/00; H04L 1/0031; H04L 1/0057; H04L 1/0067; H04L 25/03929; H04L 27/3488; H04L 1/0013; H04L 27/2604; H04L 5/0035; H04B 7/0452; H04W 72/0413; H04W 72/042; H04W 88/02; H04W 88/08; H04W 52/60; H04W 72/0446
See application file for complete search history.

(56) References Cited

U.S. PATENT DOCUMENTS 5,258,987 A * 11/1993 Wei ..................... H04L 27/3433
714/758

* cited by examiner

*Primary Examiner* — Rahel Guarino
(74) *Attorney, Agent, or Firm* — Lee Sullivan Shea & Smith LLP

(57) ABSTRACT

The present invention provides a methods, apparatus and systems for improving a systems-level data rate on a communications link such the orthogonal frequency division multiplexed multiple access (OFDMA) downlink used in used in WiFi and LTE cellular/wireless mobile data applications. The present invention preferably uses a form of multilevel coding and decoding known as tiled-building-block encoding/decoding. With the present invention, different receivers coupled to different parallel downlink channels with different channel qualities decode different received signal constellations at different levels of resolution. This allows the downlink of the OFDMA system to operate with a significantly higher data rate, thus eliminating existing inefficiencies in the downlink and significantly increasing system level bandwidth efficiency.

20 Claims, 15 Drawing Sheets

Related U.S. Application Data continuation of application No. 15/984,683, filed on May 21, 2018, now Pat. No. 10,230,557, which is a continuation of application No. 15/607,620, filed on May 29, 2017, now Pat. No. 9,979,577, which is a continuation of application No. 14/999,006, filed on Mar. 16, 2016, now Pat. No. 9,667,459.

(51) Int. Cl.
| | | |
|---|---|---|
| *H04L 27/26* | (2006.01) | |
| *H04L 1/00* | (2006.01) | |
| *H04L 27/34* | (2006.01) | |
| *H04L 29/06* | (2006.01) | |
| *H04N 21/647* | (2011.01) | |
| *H04W 72/04* | (2009.01) | |

(52) U.S. Cl.
CPC .... *H04L 27/3488* (2013.01); *H04L 29/06006* (2013.01); *H04L 69/02* (2013.01); *G06T 2207/30242* (2013.01); *H04L 5/0007* (2013.01); *H04L 65/10* (2013.01); *H04L 65/80* (2013.01); *H04N 21/647* (2013.01); *H04W 72/0446* (2013.01)

SELECTIVE MAPPING OF CODED MULTI-CHANNEL TRANSMISSION

This patent application is a continuation of U.S. patent application Ser. No. 16/298,740, filed Mar. 11, 2019, which is a continuation of U.S. patent application Ser. No. 15/984, 683, filed May 21, 2018 and now issued as U.S. Pat. No. 10,230,557, which is a continuation of U.S. patent application Ser. No. 15/607,620, filed May 29, 2017 and now issued as U.S. Pat. No. 9,979,577, which is a continuation of U.S. patent application Ser. No. 14/999,006, filed Mar. 16, 2016 and now issued as U.S. Pat. No. 9,667,459, and each of these applications is incorporated herein by reference.

FIELD OF THE INVENTION

This invention relates generally to coded modulation techniques for use in digital communication systems such as orthogonal frequency division multiplexed multiple access (OFDMA) systems. More particularly, the invention relates to methods and apparatus for multilevel coding and decoding. Different receivers coupled to different parallel downlink channels with different channel qualities decode different received signal constellations at different levels of resolution. This allows the overall OFDMA downlink to operate with a significantly higher data rate, thus significantly increasing system level bandwidth efficiency.

BACKGROUND OF THE INVENTION

The OFDMA downlink of LTE (long term evolution) mobile wireless data systems operated by carriers in the licensed bands has always been hindered by key system level bottlenecks and congestion. Also, WiFi has been solely deployed in unlicensed bands where huge spectrum is available in 2.4 Ghz (UHF) and 5 GHz band. Up until now, WiFi has been the only major player in these bands. But as the licensed bands are hitting congestion, operators are looking to deploy LTE in unlicensed spectrum as well. There are two main types of LTE in unlicensed band, 1) LTE-U (Qualcomm) and LAA (3GPP). With these new technologies, incumbent WiFi has no choice but to share spectrum resources in TDD (time division duplex) with LTE-U and LAA. Hence, spectrally efficient utilization of the unlicensed bands is becoming more critical for WiFi down links. Similarly, LTE on the unlicensed bands has to cooperate with incumbent WiFi so that new technologies offering enhanced downlink efficiency for any or all of LTE, LTE-U, LAA, and WiFi systems are needed. Other higher bandwidth OFDMA technologies such as "GigaFi" are being introduced to provide higher data rates than can currently be achieved with WiFi. New technologies offering enhanced downlink efficiency for GigaFi or other types of next-generation enhanced short range or long range systems are also needed.

LTE and WiFi systems typically involve a multi-user downlink that employs orthogonal frequency division multiplexed multiple access (OFDMA). For example, in LTE systems, different mobile units will be assigned respective resource blocks that each identify a set of 12 OFDM tones (tone=line frequency). Each resource block includes 12 15 KHz wide sub-carriers (on the frequency axis) and 14 (or 12) OFDM symbols on the time axis. Hence each resource block will carry 168 (or 144) data or control symbols at a specified bit loading that can consist of QPSK (4-QAM), 16-QAM, 64-QAM, or 256-QAM. In LTE, each resource block will be transmitted in 1 ms and occupies 180 KHz bandwidth. Other technologies such as cable modems use a different downlink channel other than OFDMA, but have similar issues with different attached cable modems having different quality downlink channels.

Consider a simplified exemplary system where half of the mobile units have strong channels and are assigned resource blocks that use 256-QAM (eight bits per data tone) while the second half of the mobile units have weak channels and are assigned resource blocks that use 4-QAM (two bits per data tone). In such an example, due to the lower bit loading used in the downlink resource blocks assigned to the second half of the mobile units, the total downlink throughput is much less than the maximum that could be achieved if all of the mobile units had strong channels that could support resource blocks that used 256-QAM. It would be desirable to be able to increase the net throughput of the LTE and WiFi downlinks by allowing the data symbols of resource blocks associated with the weak channels to carry additional bits that could be received and decoded by mobile units that can see those same data tones through the lens of the strong channels.

Tiled-building-block trellis codes are a family of codes that typically use trellis codes such as convolutional codes and turbo codes (e.g., parallel concatenated convolutional codes) as distinct codes in a multilevel coded system. Such coded systems are described in detail in U.S. Pat. No. 8,077,290 and M. A. Naim, J. P. Fonseka, And E. M. Dowling, "A Building-Block Approach for Designing Multilevel Coded Systems," IEEE Com Letters, Vol. 19, N0. 1, January 2015, "the Naim reference." U.S. Pat. No. 8,077, 290 is incorporated herein by reference and the reader is referred to this patent to better understand the background of tiled-building-block trellis codes. A building-block-trellis code is used to construct a small compact signal constellation building block which is called a "coded-constellation-building block," or, a "building block" for short. A tiling code is also employed to allow the small powerful building blocks to be tiled to form larger constellations with a tile spacing that is selected to preserve the building block's MSED. Associated with the tiling code is a signal constellation called the "tiling constellation." At each constellation point of the tiling constellation is placed a copy of the building block. Each constellation point of the tiling code is referred to as a "tiling point." The "intra-block MSED" is defined as the MSED between constellation points within a building block, and the "tiling MSED" is defined as the MSED between the centers of the tiled building blocks, i.e., the MSED between tiling points in the tiling constellation. In terms of coded sequences, the "sequence-level intra-block MSED" is the distance between coded sequences of constellation points within a building block and the "sequence-level tiling MSED" is the distance between coded sequences of tiling points (tile center locations).

It would be desirable to have methods, apparatus and systems for improving a systems-level data rate on a communications link such as those used in the downlink of OFDMA systems. It would be desirable to have a technology that uses tiled-building-block encoding/decoding in a configuration that allows different receivers coupled with different parallel downlink channels with different channel qualities to decode different received versions of the transmitted signal constellation at different levels of resolution. It would be desirable to have a technology that could reduce or eliminate existing inefficiencies in the downlink of OFDMA systems to thereby allow the downlink to operate with a significantly higher data rate, thus significantly increasing system level throughput and spectral efficiency.

SUMMARY OF THE INVENTION

A first aspect of the invention centers on methods, apparatus, and communication systems that involve a headend such as a base station that is coupled to a first mobile unit via a first communication channel that is able to support a $2^{m1}$-ary signal constellation and a second mobile unit via a second communication channel that is able to support a $2^{m2}$-ary signal constellation. The first communication channel and the second communication channel can optionally correspond to respective first and second wireless communication paths traversed by an OFDMA (orthogonal frequency division multiple access) downlink signal that carries a shared/multi-resolution signal constellation. For example, such embodiments can include LTE, WiFi, GigaFi, or any of the types of systems mentioned in the background section above or in the detailed description below. The first mobile unit is directed to receive a $2^{m1'}$-ary signal constellation and the second mobile unit is directed to receive a $2^{m2'}$-ary signal constellation, where m1, m2, m1' and m2' are positive rational numbers (typically integers), and m1'≤m1 and m2'≤m2, m1<m2. The headend (e.g., base station) typically includes an apparatus that includes a first encoder that is coupled to receive a first stream of bits associated with the first mobile unit. The first encoder is operative to encode the first stream of bits to form a first encoded stream of bits. The first encoder is typically implemented as a tile encoder, and encodes, for example, in accordance with a convolutional code, a block code, an LDPC code, a turbo code, or a composite/concatenation of any of the above mentioned codes. The apparatus also includes a second encoder that is coupled to receive a second stream of bits associated with the second mobile unit. The second encoder is operative to encode the second stream of bits to form a second encoded stream of bits. The second encoder is typically implemented as a building-block encoder that encodes using any of the types of codes that the tile encoder can use as stated above. The apparatus also includes a signal mapper that is coupled to receive the first encoded stream of bits and the second encoded stream of bits. The signal mapper is operative to form a symbol stream of symbols by mapping, during each of a plurality of symbol intervals, m1' number of coded bits from the first encoded stream of bits and m2' number of coded bits from the second encoded stream of bits onto a shared/multi-resolution signal constellation whose constellation points are drawn from a $2^m$-ary underlying constellation associated with a shared/multi-resolution resource block, where m≥m1'+m2'. The communication system is operative to transmit control information to direct the first mobile unit to extract first receiver demodulation information from a first sub-constellation portion of the $2^m$-ary underlying constellation and to use the first receiver demodulation information in a first decoder to form an estimate of the first stream of bits. The communication system directs the second mobile unit to extract second receiver demodulation information from a second sub-constellation portion of the $2^m$-ary underlying constellation. The second mobile unit then uses the second receiver demodulation information in a second decoder to form an estimate of the second stream of bits. The first and second receiver demodulation information typically correspond to respective first and second sequences of bit metrics calculated over a frame duration period. The first sub-constellation portion can sometimes be associated with a $2^{m1'}$-ary tile constellation and the second sub-constellation portion can sometimes be a $2^{m2'}$-ary building block constellation, in which case the $2^{m1'}$-ary constellation can optionally be selected to have an average energy E1 that is selected to be received alone by a low resolution receiver or in combination with additional signal constellation points in a higher resolution receiver. In such embodiments, the $2^{m2'}$-ary constellation is selected to have has an average energy E2 and to be received by a high resolution receiver that is able to decode a $2^m$-ary constellation. In other types of embodiments the first encoder is an upper level encoder in a multi-level code and the second encoder is a lower level encoder in the multi-level code. In some embodiments, there are additional encoders numbered three through L that are coupled to receive third through $L^{th}$ streams of bits associated with additional third through $L^{th}$ mobile units. The third through $L^{th}$ encoders are then operative to encode the third through $L^{th}$ streams of bits to form third through $L^{th}$ encoded streams of bits, where L≥3. In such embodiments, the signal mapper is further coupled to receive the third through $L^{th}$ encoded streams of bits and is operative to form the symbol stream by mapping, during each of the plurality of symbol intervals, m3' through mL' sets of coded bits from the third through $L^{th}$ encoded streams of bits onto an $2^{(m1'+m2'+\ldots+mL')}$-ary shared/multi-resolution signal constellation that is a sub-constellation of the $2^m$-ary underlying signal constellation, wherem1'+m2'+ . . . +mL'≤m.

A second aspect of the invention relates to a second mobile unit apparatus and methods for communicating with a communication system base station that is coupled to both a first mobile unit apparatus via a first channel and to the second mobile unit apparatus via a second channel. The second mobile unit apparatus includes an OFDMA downlink receiver that is configured, in response to control information associated with a shared/multi-resolution resource block, to receive data symbols from selected data tones using a selected one of a plurality of different signal constellations which include a $2^{m1}$-ary signal constellation, $2^{m1'}$-ary signal constellation, $2^{m2}$-ary signal constellation, a $2^{m2'}$-ary signal constellation and a $2^m$-ary signal constellation, where m, m1, m1', m2, and m2' are positive rational numbers, m1'≤m1, m2'≤m2, m1<m2≤m, and m≥m1'+m2'. The data symbols are drawn from a shared/multi-resolution signal constellation that is a sub constellation of the $2^m$-ary signal constellation. The second mobile unit apparatus includes at least one processor coupled to a memory which holds instructions to be executed by the at least one processor, wherein the instructions cause the at least one processor to perform various action under stored program control. A first such action includes receiving the control information from the communication system base station. Based upon the control information, a second action includes configuring the OFDMA downlink receiver to extract second receiver demodulation information (e.g., a sequence of m2' number of bit metrics per symbol over a frame of symbols) from a sequence of data symbols modulated onto respective OFDM tones associated with the shared/multi-resolution resource block, and to couple the second receiver demodulation information to a decoder that is configured to decode a coded $2^{m2'}$-ary signal constellation to form a sequence of decoded bits. In such a system, the m1' number bits are associated with a first coded bit stream whose destination is the first mobile unit apparatus. The $2^{m2'}$-ary signal constellation typically corresponds to a building block constellation, and the first encoded bit stream is typically used to identify a sequence of tiles. Similar to the first aspect of the invention described above, additional third through $L^{th}$ streams of coded bits can also be transmitted to respective additional third through $L^{th}$ mobile units via the shared/multi-resolution signal constellation. In such embodiments, the shared/multi-resolution signal constellation is typically a $2^{(m1'+m2'+\ldots+mL')}$-ary constellation, where $m1'+m2'+\ldots+mL'\leq m$.

A third aspect of the invention involves an methods, apparatus, and systems for use in a communication system that is coupled to a receiver via a communication channel. The receiver is directed to receive a $2^{m1'}$-ary signal constellation and also a $2^{m2'}$-ary signal constellation, where m1' and m2' are positive rational numbers (most often they are integers). Such an apparatus includes a first encoder that is coupled to receive a first stream of bits associated with a first application layer program that can withstand a first bit error rate. The first encoder is operative to encode the first stream of bits to form a first encoded stream of bits. A second encoder is also coupled to receive a second stream of bits associated with a second application layer program (or, in some embodiments, a lower layer stream that carries control information) that can withstand a second bit error rate. The second bit error rate is greater than the first bit error rate. The second encoder is operative to encode the second stream of bits to form a second encoded stream of bits. The apparatus also includes a signal mapper that is coupled to receive the first encoded stream of bits and the second encoded stream of bits. The signal mapper is operative to form a symbol stream of symbols by mapping, during each of a plurality of symbol intervals, m1' number of coded bits from the first encoded stream of bits and m2' number of coded bits from the second encoded stream of bits onto a shared/multi-resolution signal constellation whose constellation points are drawn from a $2^m$-ary underlying constellation associated with a shared/multi-resolution resource block, where $m\geq m1+m2'$. The communication system is operative to transmit control information to direct the receiver to extract first receiver demodulation information from a first sub-constellation portion of a $2^m$-ary underlying constellation and to use the first receiver demodulation information in a first decoder to form an estimate of the first stream of bits. The communication system is also operative to direct the receiver to extract second receiver demodulation information from a second sub-constellation portion of the underlying constellation and to use the second receiver demodulation information in a second decoder to form an estimate of the second stream of bits. In many embodiments, the first encoder is a tile encoder, the second encoder is a building-block encoder, and the first and second receiver demodulation information corresponds to respective first and second sequences of bit metrics. The first sub-constellation portion is often associated with a $2^{m1'}$-ary tile constellation and the second sub-constellation portion is often a $2^{m2'}$-ary building block constellation. In other embodiments, different types of multilevel codes can be used instead of tiled-building-block coded constellations. Any of the code types listed in this section above can be used in different embodiments in the first and second encoders. In embodiments where variable selective mapping is used, the first sub-constellation portion is a 4-ary corner constellation, the second sub-constellation portion is a non-corner constellation.

BRIEF DESCRIPTION OF THE DRAWINGS

The various novel features of the present invention are illustrated in the drawings listed below and described in the detailed description that follows.

DESCRIPTION OF THE PREFERRED EMBODIMENTS

Figure 1:
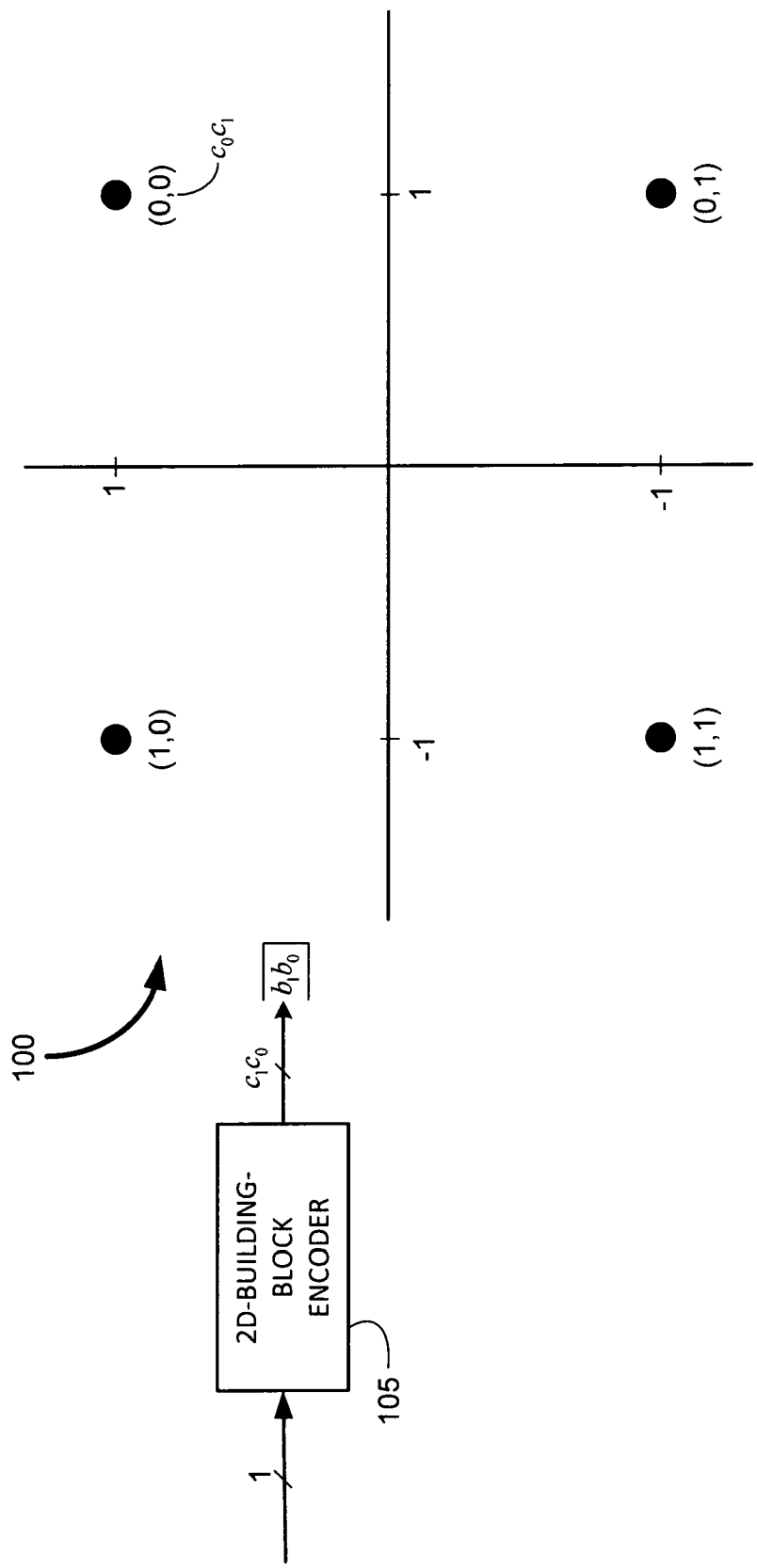
FIG. 1 illustrates a building block encoder whose coded bits are mapped to a QPSK building block signal constellation.

The present invention can be used with communication links that transmit multiple resource blocks in parallel to a plurality of mobile units such as is in the OFDMA systems described above. For example, the downlink of the LTE systems or the downlink of WiFi systems employ four different constellations: QPSK (4-QAM), 16-QAM, 64-QAM and 256-QAM for data transmission. The signal constellation selected for use with a given resource block(s)

sent to a particular mobile unit is selected based upon the downlink channel quality at the receiver of the particular mobile unit. If the particular mobile unit is coupled to the base station by one of the weakest allowable channels, the particular mobile unit will be assigned a resource block(s) that uses the 4-QAM constellation. If the particular mobile unit is coupled to the base station by a suitably strong channel, the particular mobile unit will be assigned a resource block(s) that uses the 256-QAM constellation.

The present invention observes that mobile units with strong channels will also be able to decode the resource blocks associated with the weak channels, but will see the received signal constellation associated with those resource blocks through the (high resolution) lens of a strong channel. Hence the present invention introduces the concept of Signal Constellation Multiple Access (SCMA) which can be applied in OFDMA systems to improve the net throughput in the downlink. In accordance with SCMA, certain resource blocks can be designated as shared multi-user/multi-resolution resource blocks where additional coded data bits are encoded onto data symbols associated with the resource blocks that would otherwise only be associated with a weak channel. The tiled-building-block constellation approach is preferably used in order to allow two or more different mobile units to simultaneously receive and extract their respective coded bit streams from the same received/shared signal constellation. When the spacing's between tiling points and building block points are properly selected as described in more detail below, the resulting constellation sent on the weak channels can be designed to be viewed as a multi-resolution constellation.

Consider an example where a first mobile unit in an LTE system has a weak channel and is assigned a 4-QAM constellation and where a second mobile unit has a stronger channel and is assigned a 64-QAM constellation. A tiled-building-block constellation can then be formed by mapping, during each symbol interval on each data tone, two coded bits associated with the first mobile onto a 4-QAM tiling constellation and two additional coded bits associated with the second mobile unit onto a 4-QAM building block constellation whose intra-building-block constellation point spacing matches the spacing of the LTE 64-QAM constellation. The building block points are placed around each tiling point to form the coded tiled-building-block constellation. The resulting coded tiled-building-block constellation will thus carry four bits instead of two bits per data tone.

Upon reception, the first mobile unit with a weak channel can be directed to view the received signal associated with the shared/multi-user resource block at low resolution(distant view) as though it was only made up of the 4-QAM tiling constellation. In this case the first mobile unit would extract bit metrics from the received constellation assuming it was a 4-QAM constellation. Alternatively, the first mobile unit can be directed to view the received signal associated with the shared/multi-user resource block at high resolution (close view/zoomed in view) to thereby see a subset of 64-QAM constellation. In this case, the first mobile unit would extract bit metrics from the received constellation assuming it was a sparse 64-QAM constellation, and would only compute bit metrics associated with the upper two levels of the received constellation's multilevel coding (i.e., the tile-encoded bits).Meanwhile, a second mobile unit with strong channel would be directed to view the received signal associated with the shared/multi user resource block at high resolution, e.g., as a subset of the 64-QAM constellation, using a standard receiver/decoder configured to receive the 64-QAM constellation. This can be achieved by extracting bit metrics from the received constellation assuming it was a sparse 64-QAM constellation, and only extracting the bit metrics associated with the building block bits (lower two levels of multilevel coding) on the 64-QAM constellation. The second mobile unit can thus run its decoder to decode only the building block bits of the received tiled-building-block coded constellation. One way to achieve this is to set all bit metrics except for the bits on the constellation associated with the building block bits to a fixed value in the currently available 64-QAM constellation decoder. In the decoder in the second mobile unit, decoded bits associated with bits that correspond to bit metrics that have been set to a known value will typically be discarded because they do not correspond to bits in a bit stream directed to the second mobile unit. Note that since the 64-QAM constellation is a subset of the 256-QAM constellation, the bit metrics could have alternatively been computed with respect to the 256-QAM constellation.

In this patent application the words "high resolution," "low resolution," and "multi-resolution" have specifically defined meanings. For example, in the LTE system, 4-QAM, 16-QAM, 64-QAM and 256-QAM constellations are defined. If a first mobile unit is to receive a tiled-building coded constellation through a weak channel and is going to view this constellation through the lens of the resolution of a $2^{m1}$-ary tiling constellation, then the first mobile unit is said to be viewing or receiving the tiled-building coded constellation at "low resolution." Viewing the constellation at low resolution can also be viewed as a "distant" view, or a "zoomed-out" view. If a second mobile unit is to receive the same tiled-building coded constellation through a strong channel and is going to view this constellation through the lens of a $2^m$-ary constellation where m≥m1+m2, where m2 is the number of coded bits in the building block coded constellation, then the second mobile unit is said to be viewing or receiving the tiled-building coded constellation at "high resolution." A high resolution view is also referred to as a "close-up" view or a "zoomed-in" view. So the tiling constellation typically corresponds to the "low resolution" or "distant-view" of the received constellation seen through the lens of the weak channel, while the building block constellation typically corresponds to a "high resolution" or "zoomed-in" view of the received constellation seen through the lens of a strong channel. As discussed above, a receiver coupled to the downlink via a weak channel can view the received constellation at low resolution or can alternatively view the constellation at a zoomed-in high resolution, but then only compute bit metrics for the upper coding level(s) of the received multi-level coded bits (i.e., the tile coded bits). Also, the term "selective mapping" is used to describe a constellation mapping process or system where different bits are mapped to a shared/multi-resolution signal constellation that are selected from different streams of coded bits. A "fixed selective mapping" is a selective mapping where bits from the different streams are pre-selected to always map to the same bit positions in the mapping. A "variable selective mapping" is a selective mapping where bits from the different streams can be selected to map to the certain bit positions in the mapping as a function of other bits in the same symbol or as a function of other bits in a primary stream.

A multi-level coded constellation whose upper coding levels are to be received/decoded by a first receiver (e.g., inside of a first mobile unit) and whose lower coding levels are to be received/decoded by a second receiver (e.g., inside of a second mobile unit) is said to be a "multi-resolution" constellation. Directives regarding multi-resolution constellations (e.g. tone assignments, bit stream sources and/or bit stream destinations, constellation sizes, and the like) are typically specified in control information. In general, as discussed in further detail below, more than two mobile units can be directed, via control information sent from the base station to the mobile units, to receive different coding levels of a multilevel coded constellation that is associated with a shared/multi-resolution resource block. Software involved in creating, communicating, and/or configuring hardware or software modules in response to information in resource blocks and/or shared/multi-resolution resource blocks is called the "coding control sub layer" herein.

In certain preferred embodiments involving LTE and WiFi, SCMA can be used to augment OFDMA to thereby increase the net throughput from the base station in the downlink direction. In such embodiments, this can be achieved by only making minor modifications to the base station software used to control the encoding of resource blocks and also making minor modifications to the mobile unit software used to control the decoding of resource blocks (coding control sub layer). The lower level coding and decoding software modules (coding DSP sub layer) can remain unchanged, with the minor modifications coming at a coding control sub layer that determines what portions of what resource blocks need to be encoded or decoded with the existing coding DSP sub-layer software modules. It is also possible to make additional optimizations or changes by modifying the coding DSP sub layer, for example, by employing a different building blocks such as the 4D building block as described in connection with FIGS. 10, 13-14 of the U.S. Pat. No. 8,077,790 patent.

As discussed in the final paragraph of the U.S. Pat. No. 8,077,790 patent, it should be noted that the term "trellis code" can refer to various types of codes such as a convolutional code or a convolutional code that has been augmented as a concatenated code to form a Turbo code. Turbo codes are the type of trellis codes used in LTE and WiFi OFDMA systems. The U.S. Pat. No. 8,077,790 patent goes on to state that a "trellis code" can alternatively be augmented to include a concatenation with a block code. Therefore, in this application, instead of using "tiled-building-block trellis" as a modifier for "code," "encoder," "decoder," etc, the modifier "tiled-building-block" will be used instead. This is done to avoid any confusion and to further allow other types of codes to be used in the tile and/or building block encoder such as pure block codes or LDPC codes. For example, instead of reciting a "trellis encoder" as in the U.S. Pat. No. 8,077,790 patent, the instant patent application would recite "encoder," so that additional types of encoders like pure block encoders and LDPC encoders would also be explicitly included.

Referring to FIG. 1, a building block encoder 105 is shown whose coded bits are outputted and mapped to a Gray coded 4-QAM building block. The building block encoder 105 can encode using a convolutional code, a turbo code, a block code, or any other kind of code such as a low density parity check (LDPC) code, or a constrained turbo block convolutional (CTBC) code (see U.S. Pat. No. 8,537,919). The building-block coded bits generated by the building-block encoder 105 can alternatively be mapped to different types of building-block coded constellations such as the 4D building block coded constellation discussed in the U.S. Pat. No. 8,077,790 patent. Also, other two dimensional building blocks such as a 16-QAM constellation could be used. In some embodiments, during each symbol interval, one or more bits in the stream are passed through the building block encoder and other bits are left uncoded prior to mapping to the building block coded constellation. In general, to within energy and distance constraints as discussed in further detail below, any 2D or higher dimensional constellation can be selected to be the building block coded constellation. Alternative embodiments are also possible where data bits are mapped to directly to the building block coded constellation without a being encoded by the building block encoder.

Figure 2:
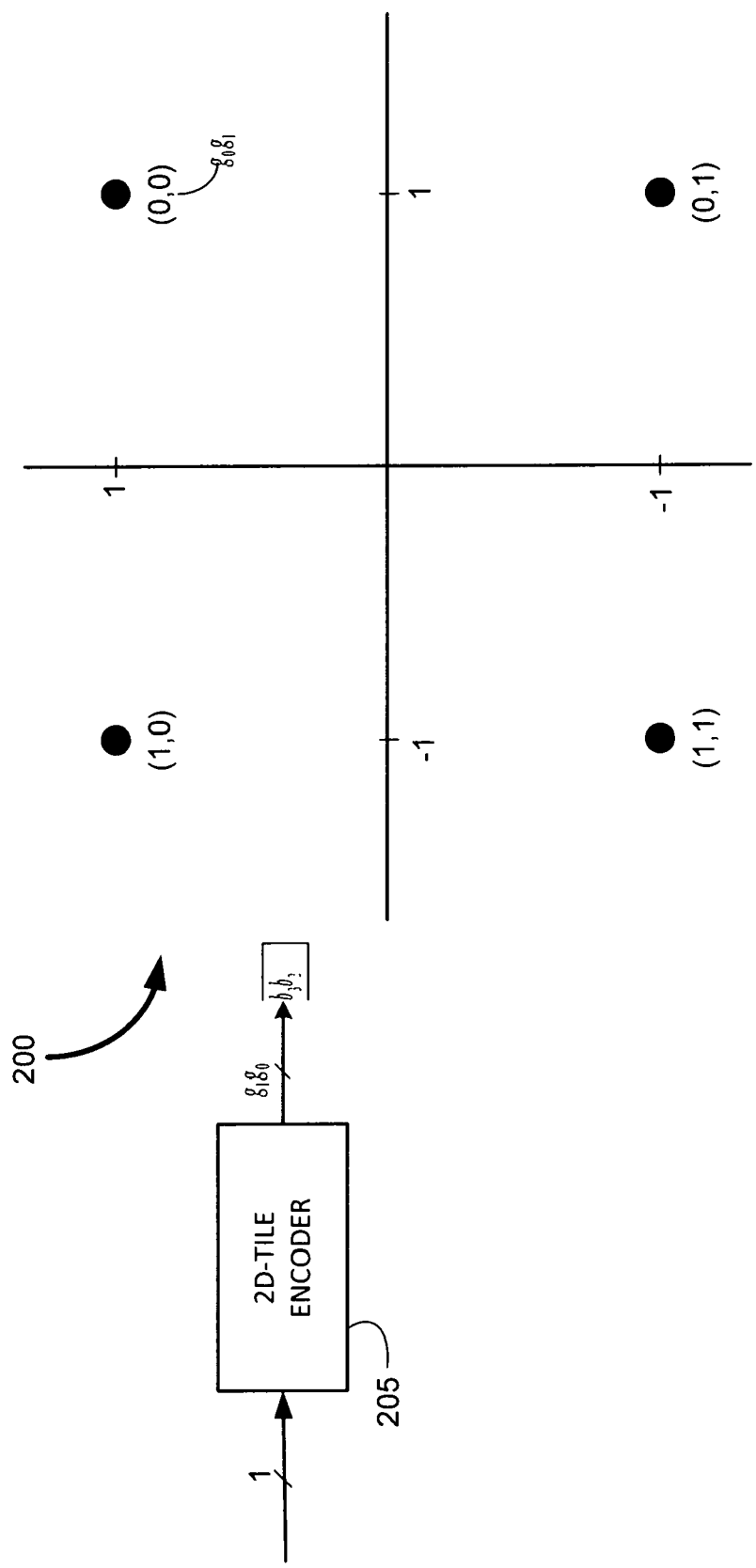
FIG. 2 illustrates a tile encoder whose coded bits are mapped to a QPSK tiling signal constellation.

Referring to FIG. 2, an example tiling encoder 205 is shown whose coded bits are outputted and mapped to a Gray coded 4-QAM constellation. The tiling encoder 205 can encode using a convolutional code, a turbo code, a block code, or any other kind of code such as a low density parity check (LDPC) code, or a constrained turbo block convolutional (CTBC) code. The tile coded bits generated by the tile encoder 205 can alternatively be mapped to different types of tiling constellations such as 16-QAM and 64-QAM constellations as specified for use in resource blocks in LTE and WiFi. In some embodiments, one or more bits in the stream are passed through the tile encoder and other bits are left uncoded prior to mapping to the tiling constellation. Alternative embodiments are also possible where data bits are mapped directly to the tiling constellation without being encoded by the tiling encoder.

Figure 3:
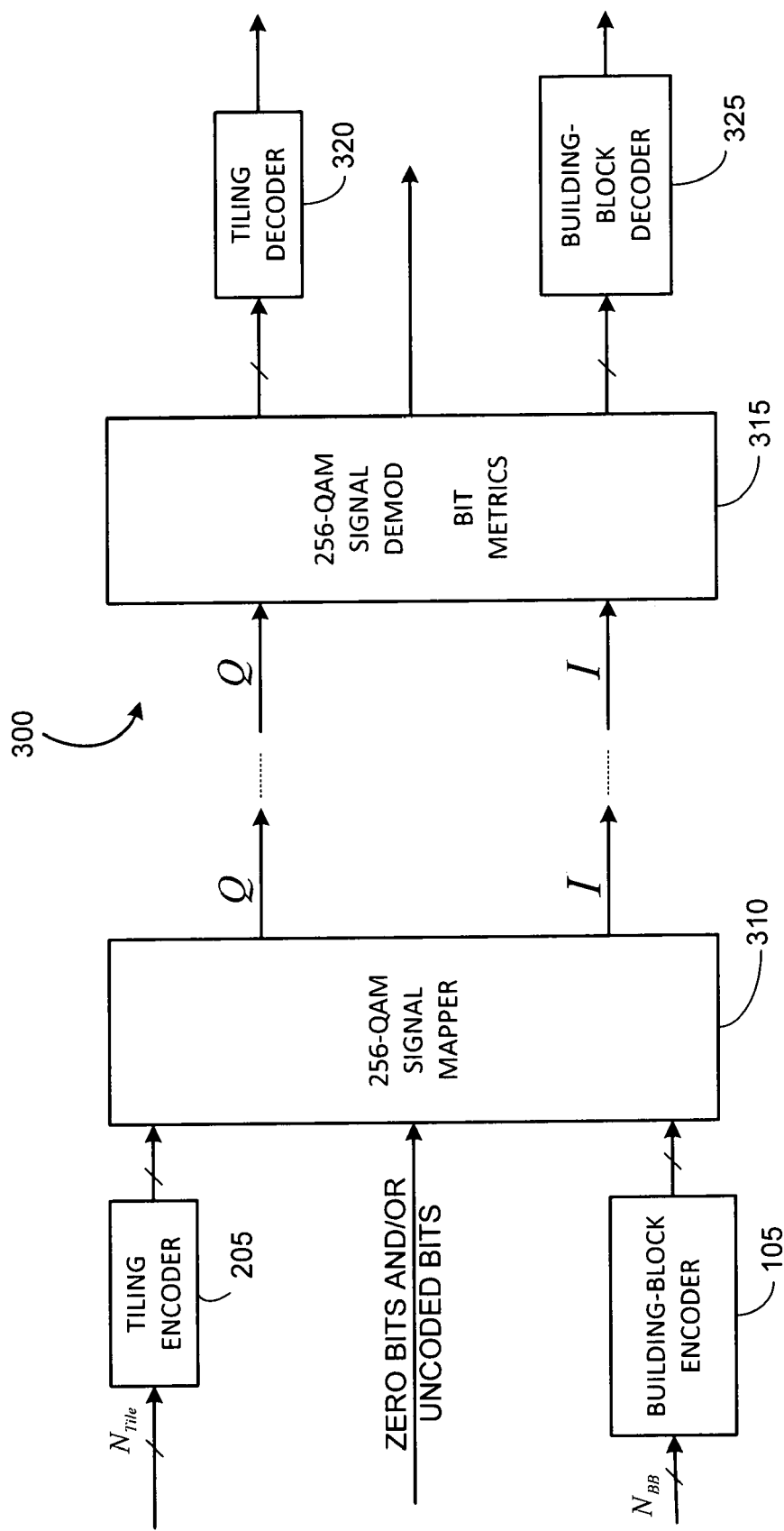
FIG. 3 is a block diagram illustrating a tiled-building-block encoder and constellation mapper that is used to multi-level encode two sequences of bits to be mapped onto the a shared/multi-resolution constellation such as the 16-QAM constellation as shown in FIG. 4, and to be demodulated and decoded in a receiver, for example in a mobile unit.
Figure 4:
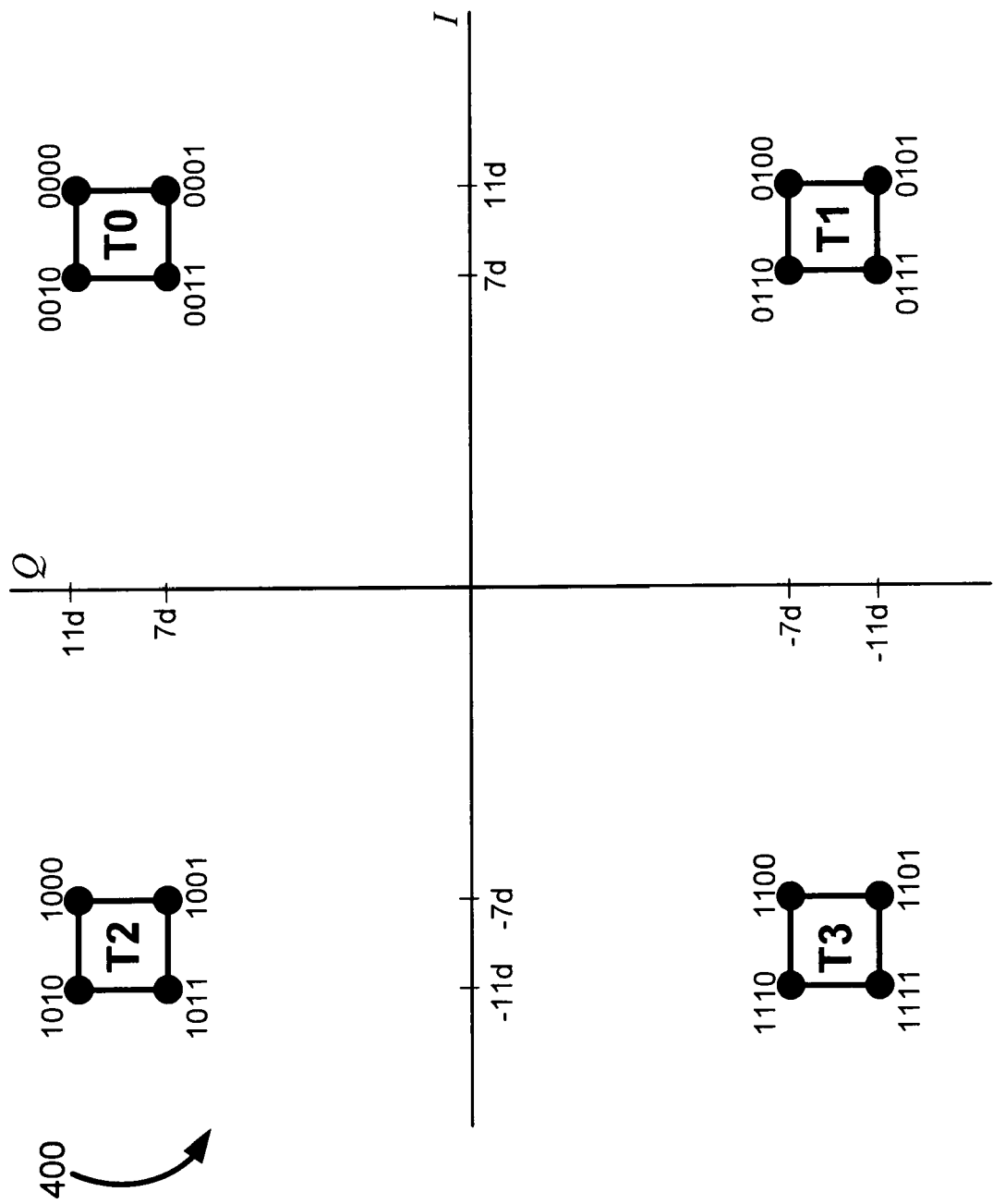
FIG. 4 shows a sparsely populated shared/multi-resolution 16-QAM constellation that is a sub-constellation of a 64-QAM constellation and a 256-QAM constellation.

Referring to FIG. 3, a tiled-building-block encoder and signal mapper 105, 205, 310 is shown for transmitting a modulated signal into a channel that is then received by a demodulator 315 and decoded by separate decoders 320 and 325. The tiled-building-block encoder and signal mapper includes the building block encoder 105 and the tile encoder 205 that can be embodied in any of their variations or alternative embodiments such as those previously described in connection with FIG. 1 and FIG. 2. The outputs of the building block encoder 105 and the tile encoder 205 are coupled to the inputs of a signal mapper 310. This allows the coded bits from the encoders 105 and 205 to be mapped by the signal mapper 310 to a tiled-building-block coded constellation. For example, if the building block encoder of FIG. 1 is used so that there are two coded bits per building block, and if the tile encoder of FIG. 2 is used so that there are two coded bits for tile selection, and if signal mapper 310 is a 256-QAM signal mapper as illustrated in the embodiment of FIG. 3, then the signal mapper will map a sparsely populated tiled-building-block constellation whose constellation points form a subset of the 256-QAM constellation as shown in FIG. 4. In this example, the 256-QAM constellation can be referred to as the "high resolution constellation" or the "underlying constellation." Note that the constellation points in FIG. 4 have only four-bit labels. Since the constellation points of a 256-QAM constellation have eight-bit labels, four all-zero remaining bits can be appended to the labels shown in FIG. 4 to arrive at the 256-QAM eight-bit labels. If such zero bits are appended, these are shown as the "zero bits" input to the 256-QAM signal mapper 310. In some embodiments, other fixed labels besides all zeros can be appended, and they need not always be appended to the least significant bits, and exactly how these bits are appended will depend on the bit labeling scheme of the underlying constellation. For example, the four additional bit labels of the standard 256-QAM constellation corresponding to the signal points chosen in FIG. 4 could be added to extend the four bit labels of FIG. 4 to the standard eight bit labels of the underlying 256-QAM constellation. In some embodiments, one or more uncoded bits could additionally or alternatively be added to the extend the bit labels. The uncoded bits are typically added to the most significant bits or are inserted between the tile coded bits and the building-block encoded bits as opposed to being inserted at the least significant bits.

Also, the "zero bits and/or uncoded bits" as per FIG. 3 are optional and are not needed/used in some embodiments. Further discussion of the signal demodulator 315 and the decoders 320 and 325 is provided below in connection with FIGS. 6 and 7.

In alternative embodiments, the signal mapper 310 can be configured to map the encoded bits onto a 64-QAM underlying constellation or other sized constellations as opposed to the 256-QAM constellation. For example, building block coded constellation and the tile encoded constellation could both be selected to be 4-QAM while the high resolution constellation (underlying constellation) used in the mapper 310 could be selected to be 64-QAM instead of 256-QAM. A key concept is for the signal mapper 310 to map to a fixed known higher resolution constellation so that the tiled-building-block coded constellation can be used in connection with a shared multi-user/multi-resolution resource block as described above. In the context of the LTE and WiFi example, note that if the building block is the building block of FIG. 1, then the tiling constellation of FIG. 2 can be selected to be 4-QAM, 16-QAM, or 64-QAM, depending on channel and power parameters. If the tiling constellation is 4-QAM or 16-QAM, the resulting tiled building-block-coded constellation can be made to be a sparsely populated subset of the 256-QAM constellation. In the case that the tiling constellation is 64-QAM, then the multi-user/shared constellation associated with the multi-user/shared resource block will include the entire 256-QAM constellation. In these examples, a first mobile unit with a weak channel is configured to receive the tiling code on a 4-QAM, 16-QAM, or 64-QAM tiling constellation and a second mobile unit with access to the 256-QAM quality channel would then additionally receive a set of building block encoded bits. Other configurations are also possible. The spacing of the constellation points within the building block and the spacing between building blocks will be selected in accordance with the underlying constellation, the condition of the two channels, the selected codes used in the encoders 105, 205 and the required performance levels of the two channels.

In other types of alternative embodiments, for example, as discussed in connection with FIG. 8 below, FIG. 3 can be modified to accept data from more than two stream sources. In such embodiments, tiles and/or building blocks can optionally be built from more than one stream each, and there can be multiple tile encoders/decoders 205/320 and multiple building block encoder/decoders 105/325. Also, the stream sources can include control stream sources in addition to or in lieu of data stream sources, and may be completely control stream sources. In general, the encoder/decoded by L respective decoders. The stream sources can be any type of bits, such application layer bit streams, or other kinds of bit streams, such as control bit streams decoder of FIG. 3 can send L streams which can be encoded by L respective encoders and for the application layer or lower communication layers.

Referring to FIG. 4, an example consisting of a 16-ary tiled-building-block coded constellation that is a sparsely populated subset of a 256-QAM constellation is shown. The constellation shown in FIG. 4 is suitable for use in the shared/multi-resolution resource blocks as described above. Note that the standard 256-QAM constellation has signal points at locations (I, Q) where I and Q are odd integers in the range [−15d, +15d], where d corresponds to the amplitude scaling of the 256 QAM constellation to adjust the transmitted power. In the constellation shown in FIG. 4, the tile centers are located at ($\pm 9d, \pm 9d$). The constellation point placement as shown in FIG. 4 was selected so that the average transmitted power of the tiled building block constellation in FIG. 4 is similar to that of the 4-QAM constellation used by the first mobile unit as per the LTE and WiFi standards.

The tiled-building-block constellation of FIG. 4 which uses the {$\pm 7d, \pm 11d$} constellation points can be viewed as being a subset of the LTE 256-QAM constellation/channel. The tiled-building block constellation of FIG. 4 is used to transmit two bits from a first stream $d_1$ using a 4-QAM tile constellation while maintaining spacing between the building blocks, with a minimum spacing of 18d between tile centers, to maintain the desired performance of channel 1 with the LTE 4-QAM channel. This same constellation of FIG. 4 is also used to transmit two bits from a second stream $d_2$ to form a 4-QAM building block whose intra-building-block points are spaced with a minimum spacing of 4d between points within a building block, thereby maintaining similar performance to the LTE 64-QAM channel. Note that the constellation-point indices shown on the I and Q axes of FIG. 4 are given in terms of multiples the distance d, where 2d represents the spacing of constellation points on a 256-QAM constellation such as the one specified for use in LTE. However, the spacing between the intra-building-block points of 4d corresponds to the spacing, 2c, which also corresponds to the spacing of the LTE 64-QAM constellation. Since c is approximately 2d, the points within building blocks in FIG. 4 are spaced to maintain the desired performance of the LTE 64-QAM constellation.

The sparsely populated 16-QAM sub-constellation of FIG. 4 can thus be viewed to be a subset of both the 64-QAM constellation and/or the 256-QAM constellation. In such cases the 64-QAM constellation would be considered to be the underlying constellation because the intra building block constellation points are spaced in accordance with the minimum spacing of the 64-QAM constellation. The 16-QAM constellation of FIG. 4 sends two bits from stream $d_1$ on the 4-QAM tiling constellation and also sends two bits two bits from stream $d_2$ on the building block constellation. In accordance with aspects of the present invention, instead of using a sparsely populated constellation as shown in FIG. 4, more constellation points of the underlying 64-QAM constellation or the higher resolution 256-QAM constellation could be sent each symbol interval. For example, the building block could be made to be 16-QAM and/or the tiling code could be made to be 16-QAM, and the intra building block spacing could be made in accordance with either the 64-QAM constellation or the 256-QAM constellation.

Figure 5:
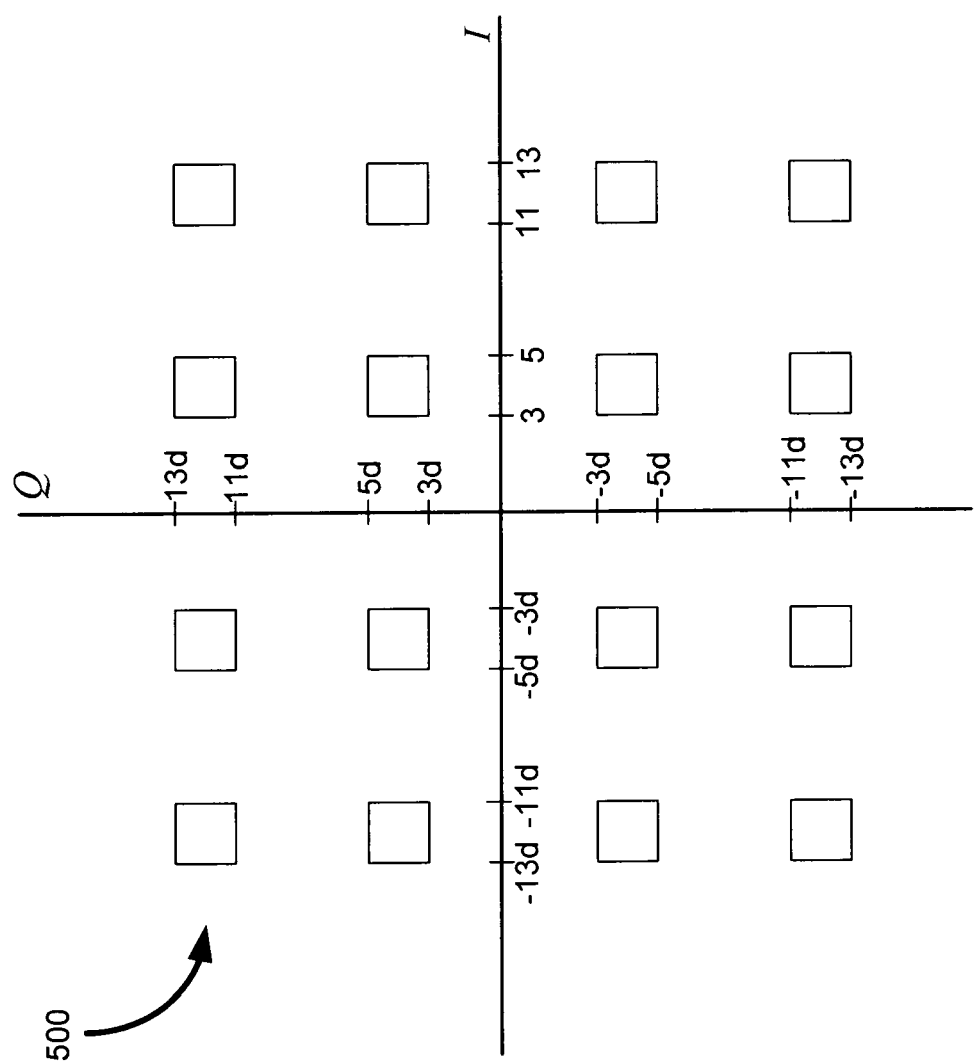
FIG. 5 shows a sparsely populated shared/multi-resolution 64-QAM constellation that is a sub-constellation of a 256-QAM constellation.

Referring to FIG. 5, an example of a 64-ary tiled-building-block coded constellation that is a subset of the LTE 256-QAM constellation is shown. In this figure the tiles are shown and the building block points are assumed to come from FIG. 1 and coincide with the four corners of each tile. In this figure the tile constellation is a 16-QAM constellation whose tile centers (e.g., (4d,12d)) were selected so that the average power in the 16-QAM constellation received by the first mobile unit would coincide with the correct average powers of the 16-QAM constellation as per the LTE and WiFi standards.

Figure 6:
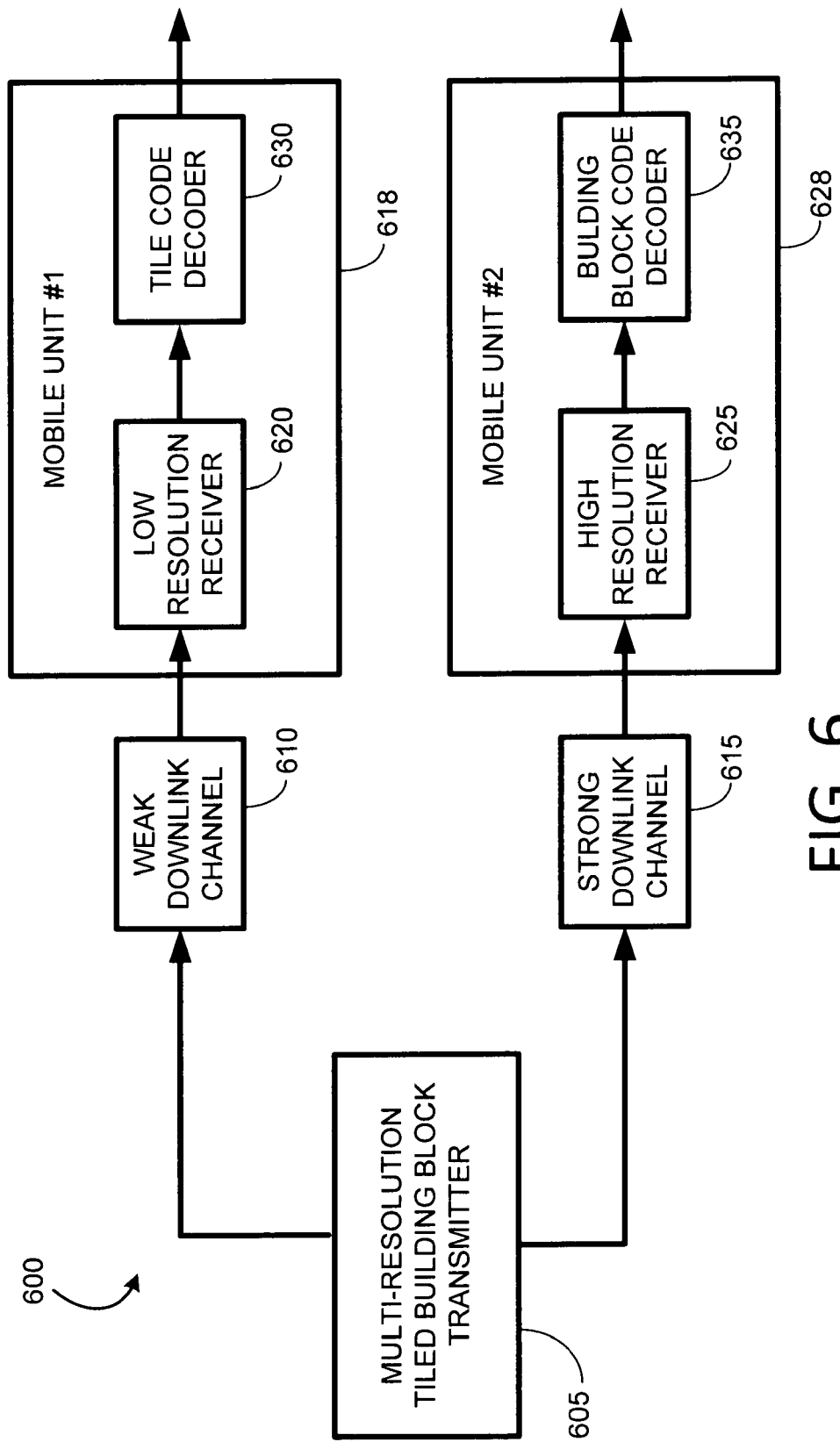
FIG. 6 is a block diagram that illustrates how SCMA is employed to allow first and second mobile units coupled to the OFDMA downlink to decode a shared/multi-resolution QAM constellation in parallel to achieve a net higher data throughput in the OFDMA downlink.

Referring to FIG. 6, a block diagram of an OFDMA system that has been augmented with SCMA is shown. A multi-resolution tiled-building-block transmitter 605 is used to encode at least some resource blocks with coded data bits from at least a first stream whose destination is a first mobile unit associated with a weak channel and also with coded data bits from a second stream whose destination is a second mobile unit associated with a strong channel. For example, the low resolution signal constellation corresponds to an $2^{m_1}$-ary tile constellation associated with a first stream of coded bits, $d_1$, and the higher resolution constellation corresponds to a $2^m$-ary constellation that includes a $2^{m_2}$-ary building block coded constellation as a sub constellation. In this example, the coded bits mapped to the $2^{m_2}$-ary building block coded constellation are associated with a second stream of coded bits, $d_2$.

To better understand demodulation, bit metric calculation and decoding, see FIG. 3 and note blocks 315, 320, and 325. For example, block 315 can be implemented in blocks 620 and 625, the tile decoder 630 can generally correspond to the tile decoder 320, and the building block decoder 635 can generally correspond to the building block decoder 325. Therefore, again consider FIG. 3 and as per FIGS. 1, 2 and 4, assume the building-block encoder 105 and the tile encoder 205 each encode onto 4-QAM building block and tiling constellations, and assume the signal mapper maps to an underlying 256-QAM constellation. Also assume that the two bits per 256-QAM symbol that go into the tile encoder 205 come from a stream $d_1$ whose destination is mobile unit #1 618, and that the two bits per 256-QAM symbol that go into the building-block encoder 105 come from a stream $d_2$ whose destination is mobile unit #2 628. Although LTE resource block carries both data and control symbols, for the sake of simplicity, assume a single resource block to have 168 data symbols per sub-frame (1 msec).The demodulator 315 will provide two bit metrics per symbol, or a total of 168×2=336 bit metrics to each of the tiling decoder 320/630 (via 620) and the building block decoder 325/635 (via 625). If uncoded bits are in use, then additional bit metrics can be calculated corresponding to any additional bit labels that represent the uncoded bits. If any (e.g., four) zero bits (or, in general "dummy label bits") were inserted to extend the four-bit labels in FIG. 4 to the eight-bit labels of the underlying 256-QAM constellation, then no bit metrics need to be computed for these dummy/extension bit label portions. In the weak-channel mobile unit 618, bit metrics need only be computed for the bit labels that correspond to the tile encoded bits, e.g., the two MSBs of the bit labels shown in FIG. 4. In the strong-channel mobile unit 628, bit metrics need only be computed for the bit labels that correspond to the building-block encoded bits, e.g., the two LSBs of the bit labels shown in FIG. 4. The tile decoder 320, 630 will then decode a frame of 336 bits (4-QAM channel) and the building block decoder 325, 635 will also decode a frame of 336 bits (4-QAM channel). In an alternative embodiment of the same structure with the same tile and building block sub-constellations, the signal mapper 310 could map to a 64-QAM underlying constellation, and two less dummy bit labels would be needed.

As mentioned previously, the tiled-building-block encoded constellation can be used to send data in accordance with shared/multi-resolution resource blocks associated with the SCMA augmentation feature. As shown in FIG. 6, the tiled-building-block encoded constellation is transmitted via the OFDMA downlink to be received by two (or more, not shown) mobile units. The tiled-building-block encoded constellation simultaneously passes in parallel through a weak downlink channel 610 and a strong downlink channel 615. The output of the weak downlink channel 610 is received by a first mobile unit via a low resolution receiver 620. The low resolution receiver is configured to receive in a low resolution/distant view mode, e.g., 4-QAM, 16-QAM, or 64-QAM. The receiver 620 can be configured to extract bit metrics from the tiling constellation and to decode the tiling code using the tile code decoder 630. As discussed earlier, in some embodiments, the receiver 620 can view the received constellation as if the tiling constellation were sent alone, in which case the building block will be viewed as additional noise. In other embodiments, the receiver 620 will be configured to view the received constellation using a high resolution/zoomed in mode, but to then only compute bit metrics associated with the upper coding levels of the multi-level code (tile coded bit levels). Depending on which type of embodiment is selected, the tile decoder 630 will use the bit metrics from the appropriate sized constellation that correspond to the tile encoded bits. The output of the strong channel 615 is received by a second mobile unit whose receiver 625 is configured to receive in a high resolution/zoomed-in mode, e.g., 64-QAM or 256-QAM. The receiver 625 will thus be configured to extract bit metrics from the building-block bits (low intra-block MSED bits of the lower level of multi-level code) of the higher order QAM constellation and to decode the building-block code using the building-block decoder 635.

Figure 7:
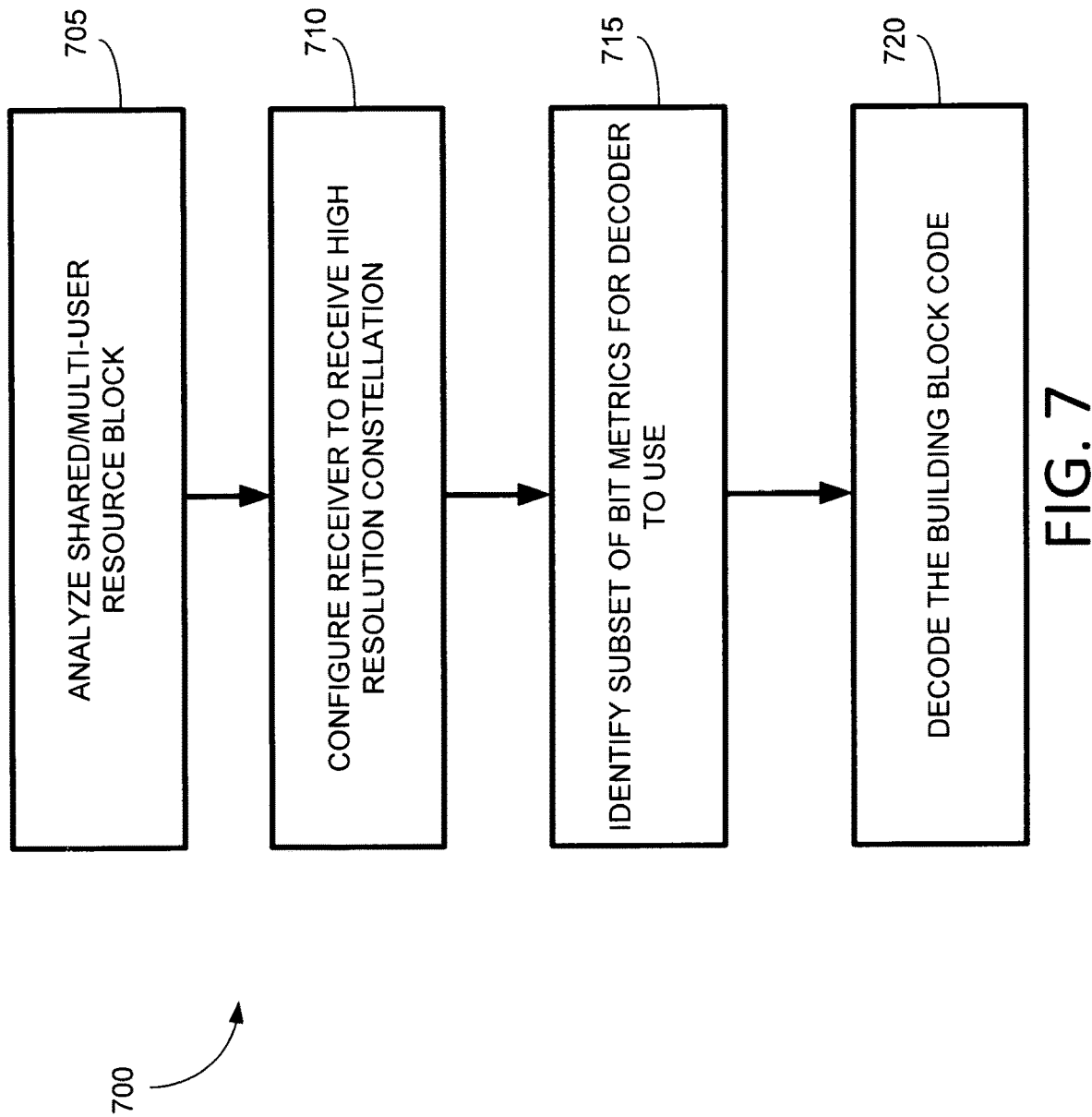
FIG. 7 is a flow chart illustrating a sequence of actions carried out by a mobile unit to configure its receiver to receive and decode in accordance with a shared/multi-user resource block.

Referring to FIG. 7, a flow chart is shown that illustrates a sequence of actions carried out in a mobile unit or other type of communications device that includes logic or computer instructions to configure itself to receive and decode an OFDMA downlink or other type of information streams such as associated with a cable modem downlink that is associated with a shared/multi-resolution resource block. As discussed in further detail below, in certain systems the receiver apparatus need not be located inside a mobile unit, and the communication system need not be OFDMA or even multi-user. To keep the discussion focused in a specific embodiment, FIG. 7 will be discussed in connection with the same exemplary multi-user OFDMA downlink type embodiments as described above.

The present invention allows data streams to be decoded irrespective of the transmission of additional bits. For example, if all streams are individually turbo coded, the bit metrics (likelihood values) of all coded bits can be extracted from the received signal the standard way as is known to those of skill in the art and as discussed in Isaka, M.; Imai, H., "On the iterative decoding of multilevel codes," in *Selected Areas in Communications, IEEE Journal on,* vol. 19, no. 5, pp. 935-943, May 2001. In an embodiment where the constellation of FIG. 4 is received by the first mobile unit coupled with the OFDMA downlink via the weak channel, the first mobile unit will compute its bit metrics based upon low resolution tile constellation, i.e., the tile center locations of FIG. 4. These bit metrics can be computed by assuming that the received constellation only consists of the tile-encoded constellation. Alternatively, assuming that the full tiled-building-block constellation has been received via the underlying constellation, only the bit metrics associated with the tile-encoded bits can be extracted as described above. These bit metrics corresponding to the tile encoded bits will be passed to the decoder of stream $d_1$ which will act as a tile decoder in a multi-level code. Meanwhile, when the constellation of FIG. 4 is received by second mobile unit coupled to the OFDMA downlink via the strong channel, the second mobile unit will compute its bit metrics based upon the building-block encoded bits so as to be able to decode the inter-building-block points, e.g., as shown in FIG. 4. These bit metrics will be passed to the decoder of stream $d_2$ which will act as a building block decoder in the multi-level code. The standard $2^m$-ary high resolution demodulator can thus be made to only extract a subset of bit metrics and the existing decoder for a smaller sized stream (e.g., 4-QAM) can be used to decode the building block related bits by as discussed above. The data streams $d_1$ and $d_2$ will then be decoded, for example, using the standard turbo decoding software modules already located in the coding DSP sub layer within the LTE and/or WiFi enabled mobile units. Typically the streams $d_1$ and $d_2$ will be respectively decoded by the decoders 630, 635 in the separate mobile units 618, 628.

In the context of an OFDMA multi-user communications system, the mobile unit apparatus receives a shared/multi-resolution resource block from the base station. In the action 705, the mobile unit apparatus analyzes the received resource block to direct its OFDMA downlink receiver to be configured in accordance therewith. At action 710, the mobile unit configures its receiver to receive the high resolution constellation, e.g., 64-QAM or 256-QAM in the OFDMA systems described above. At action 715, the mobile unit configures its decoder to identify a subset of the bit metrics to be calculated and used while decoding the signal constellation on the data symbols associated with the shared/multi-user resource block. Bit metrics corresponding to bits that do not correspond to building block bits need not be computed and will not typically be sent to a the building block decoder. At action 720, the decoder 635 in the mobile unit 628 decodes the building block coded constellation over the sub-frame (e.g., 168 data symbols) as discussed above.

It should be noted that the flow chart 700 focuses on the mobile unit with the strong channel who decodes the building block as a sub constellation of the high resolution constellation. In the case where the first mobile unit views the received constellation as only consisting of a tile encoded constellation, the first mobile unit who decodes the tiling constellation at lower resolution need not be modified. This is because in such exemplary embodiments, the first mobile unit who decodes the tiling constellation is blind to the building block information that can only be seen through the zoomed-in lens of the higher resolution constellation as seen through the stronger channel. In embodiments where the first mobile unit is configured to view the received constellation in through the zoomed-in lens of the underlying constellation but as viewed through the weaker channel, the first mobile would only compute bit metrics related to tile encoded bits as discussed above in connection with 320, 630. For example, the standard LTE turbo decoder software modules at the coding DSP software layer would be used, but the bit metrics calculations portion would be modified as described above.

In the discussions above, for example in the discussion of FIG. 4, a tiled-building-block constellation was used to transmit two additional bits of channel 3 along with a starting QPSK constellation of channel 1. In the previous discussions, this tiled-building-block constellation was assumed to be sent at the starting QPSK constellation's original symbol rate. However, a multi-user SCMA system that uses OFDM or FDM can alternatively be designed to provide the same original net data transfer rate by adding more bits to the starting constellation and then slowing down the symbol rate. For example, the original data transfer rate of the QPSK channel 1 can be achieved by using the constellation of FIG. 4 and lowering the symbol rate by one half. On the other hand, as a result of slowing down the symbol rate, the tone spacing in OFDM (or bandwidth in FDM) can be lowered which allows introduction of more tones in OFDM (or more channels in FDM) within the same allocated bandwidth. The introduction of more tones (or channels) eventually leads to the same increase in the overall data transmission rate. Because all signals at the newly added OFDM tones or FDM frequency bands require additional power, such improvements require the total power to be increased. However, the slowdown in the data transfer rate increases the symbol energy and thereby improves the performance in all OFDM tones or FDM bands. Effectively, the increase in the symbol energy expands the signal constellation. In the above example, by slowing down the symbol rate by a factor of ½, the signal constellation expands by a scaling factor of $\sqrt{2}$, thereby doubling all squared distances on the constellation. As a result, the performance of each transmission improves due to the slowing down of the symbol rate. This performance improvement allows more flexibility in selecting building blocks and tiles. It thus becomes easier to construct tiled building block constellations involving more combinations of different types of channels. For example, if two bits of channel 1 and two bits of channel 2 are transmitted together at a slower rate, a 16-QAM tiled-building-block constellation can be constructed that would ensure that both channels can achieve the desired LTE performance. SCMA embodiments as discussed here can thus be used to increase the net data transfer rate, improve performance, lower the symbol rate, relax design constraints and parameter tightness, or provide various combinations thereof.

The above disclosure focused on specific embodiments of the present invention that used SCMA to improve the OFDMA downlink by sharing a signal constellation between two mobile units. At this point, consider the general case of N streams, $d_1, d_2, \ldots, d_N$, where each stream $d_i$ employs a constellation $C_i$. Let $D_1^2, D_2^2, \ldots, D_N^2$ be the minimum squared Euclidean distance (MSED) values of the constellations $C_1, C_2, \ldots, C_N$ respectively. Without loss of generality, assume that $D_1 \geq D_2 \geq \ldots \geq D_N$. Let the size of each constellation $C_i$ be $2^{mi}$ so that the stream $d_i$ transmits mi number of bits per symbol interval using its constellation $C_i$. If the same average transmitted energy is used by all constellations $C_1, C_2, \ldots, C_N$, it follows from $D_i \geq D_{i+1}$, that $mi \leq m(i+1)$, $i=1,2, \ldots, N-1$. Hence, when transmitting a stream $d_i$ with a lower value of i, the throughput of the link is lower due to its smaller $2^{mi}$-ary constellation. Throughout this discussion, streams $d_i$ with lower values of i are referred to as "lower streams" and those with higher values of i are referred to as "higher streams." Using this terminology, $d_1$ is the lowest stream and $d_N$ is the highest stream.

In its more general forms, selective mapping in accordance with the present invention involves modification of the signal constellation $C_i$ associated with any lower stream $d_i$, to additionally include data from one or more different higher streams, j>i. For example, by using a larger signal constellation, in addition to the mi bits of the lower stream $d_i$, mj' bits from a higher stream, j>i, could also be sent during each symbol interval. Similarly, a larger signal constellation could be constructed to send, in addition to the mi bits of the lower stream $d_i$, a set containing L number of higher streams $j_k$>i, k=1,2, \ldots, L, from which bits will be transmitted during each symbol interval.

First consider the case where L=1 so that only one higher stream j>i is used to provide additional bits each symbol interval. The transmission of mi bits from the lower stream $d_i$ and mj' bits from the higher stream $d_j$ requires the constellation $C_i$ to be expanded to larger constellation of size $2^{(mi+mj')}$. This larger constellation is preferably constructed by following the tiled-building-block approach as described above and in U.S. Pat. No. 8,077,790. In this example, a $2^{mj'}$-ary constellation $C_{j'}$ is first selected for the transmission of mj' bits from stream $d_j$. By design, a MSED value of $D_j^2$ or a value close to it is preferably selected for use in $C_{j'}$ to thereby maintain about the same performance (bit error rate, BER) for the stream $d_j$. Next the constellation $C_{j'}$ is viewed as a building block, and a$2^{(mi+mj')}$-ary tiled-building-block coded constellation is preferably constructed by viewing the constellation $C_i$ as a tiling constellation and placing a copy of the building block $C_{j'}$ at each tiling point therein. This will result in a tiled-building-block coded constellation having $2^{mi}$ copies of $C_{j'}$, with each one centered around a tiling point $C_i$. The dimensions of the constellation $C_{j'}$ and the spacing between copies of $C_{j'}$ can be adjusted to achieve the expected performance of steams $d_i$ and $d_j$. When the ratio $D_j^2/D_i^2$ is small, any degradation in performance of streams $d_i$ and $d_j$ caused by transmitting mj' bits of stream $d_j$ along with mi bits of stream $d_i$ becomes negligible, particularly when powerful codes such as turbo codes are employed in both streams $d_i$ and $d_j$. The fixed selective mapping policy used within the building block to map combinations of different mj' bits from stream $d_j$ to $2^{mj'}$ different points of the building block $C_{j'}$ can be chosen depending on the requirement of the code used for stream $d_j$. Similarly, the mapping policy used to assign combinations of mi bits of stream $d_i$ to different tiles can be chosen according to the requirements of the code used in stream $d_i$. When the above approach is applied, the throughput of the link that would otherwise only be used to send the lower stream $d_i$ is increased from mi to (mi+mj') coded bits per interval.

Next consider the more general case where more than just two streams are mapped into a single tiled-building-block coded constellation, i.e., where L>1. In this case, there is one lower stream $d_i$ and a plurality of higher streams, $d_{j1}$, $d_{j2}, \ldots, d_{jL}$ ($j_k$>i, k=1,2, ..., L), each feeding mj1', mj2', ..., mjL' bits respectively with $j_1 < j_2 < \ldots < j_L$, instead of a single higher steam $d_j$. By defining ms=mj1'+ mj2'+ ... +mjL', a total of ms number of additional bits from higher streams $d_{j1}, d_{j2}, \ldots, d_{jL}$ will be combined with the mi bits from stream $d_i$ and transmitted therewith during each symbol interval using a $2^{(mi+ms)}$-ary constellation. This $2^{(mi+ms)}$-ary constellation can be constructed using the same tiled-building-block approach described above.

Based on the discussion of the paragraph above, the tiled-building-block constellation can be constructed by starting from a building block to transmit mjL' bits of stream $d_{jL}$, and applying the tiled building block principle successively L times to obtain the final $2^{(mi+ms)}$-ary constellation. Note also that building blocks and tiling constellations need not be two dimensional but can be built up from 1D constellations. For example, the 2D building blocks as shown in FIGS. 1, 4 and 5 could be constructed as two separate 1D building blocks. For example, the I component of the building block could come from stream $d_{jL}$, while the Q component of the building block could come from stream $d_{jL-1}$. If the 2D building blocks shown in FIG. 4 and FIG. 5 were built up this way as two 1D building blocks, then the 2D building block would appear to rectangular as opposed to square, and would be encoded and decoded as two 1D building blocks as opposed to a single 2D building block. In another similar example, a 16-QAM tiling constellation could be built up with, for example, four coded bits per symbol, with two bits taken from stream d1 and one bit each taken from streams d2 and d3. This could lead to tile constellations that are elongated (rectangular) as opposed to the square shape as shown in FIG. 5. Similarly, tiles can also be 1D.

Figure 8:
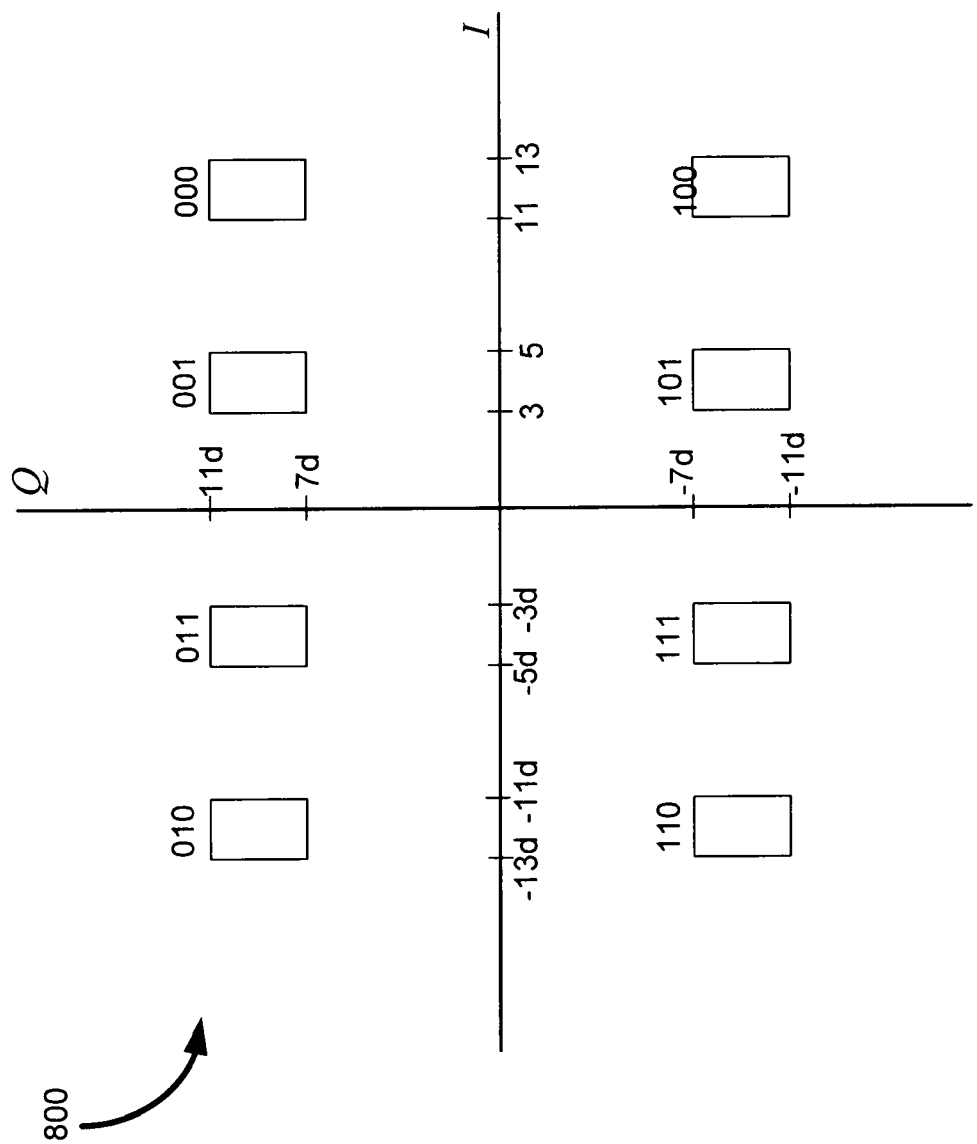
FIG. 8 shows a tiled-building-block constellation where tiles and building blocks are constructed from more than one stream each, and in this example, the resulting tiles and building blocks are rectangular as opposed to square.

As an example, consider an embodiment that uses a 32-QAM tiled building block constellation shown in FIG. 8 to transmit one bit of channel 1 (4-QAM), two bits of channel 2 (16-QAM), one bit of channel 3 (64-QAM) and one bit of channel 4 (256-QAM) during each interval. In this example, the mapping has been selected to transmit the bit position 1 (MSB) of the 32-QAM constellation from channel 1, bit positions 2 and 3 from channel 2, bit position 4 from channel 3 and the bit position 5 from channel 4. In FIG. 8, bit positions 1, 2 and 3 are shown above each tile, and two additional LSBs (bit positions 1,2, not shown) would then indicate the four corners of each tile in accordance with the building block bits as per FIG. 1, similar to the two LSBs shown on each tile in FIG. 4. The rectangular building blocks are formed by the bit of channel 3 and the bit of channel 4. The spacing between points of building blocks are selected to maintain a minimum separation of 4d for channel 3 and a minimum separation of 2d for channel 4 to maintain the desired LTE performance for channels 4 and 5. Building blocks are spaced along the I direction to maintain a minimum separation of 8d between the centers of the building blocks which is sufficient to maintain the desired LTE performance for the two bits from channel 2. Similarly, FIG. 8 uses a minimum separation of 18d between the centers of building blocks along the Q direction to maintain the desired LTE performance of channel 1. Focusing on the two 1-dimensional PAM (pulse amplitude modulation) components along I and Q directions of the 32-QAM constellation of FIG. 8, it can be easily found that the average energy of the PAM along the I direction is $81d^2$ while that of the PAM along the Q direction is 85 $d^2$. Comparing with the standard 256-QAM constellation which uses $85d^2$ along each of its I and Q 1-dimensional PAM components, the constellation in FIG. 8 uses slightly a lower transmitted energy. If desired, the constellation in FIG. 8 can be scaled, preferably along I, to have the same transmitted energy as the standard 256-QAM.

In general, building blocks and tiles can be formed with bits from multiple channels. Further, when using building blocks to form a tiled building block constellation, it is possible to adjust the relative spacing between the building blocks to maintain the desired distances for different bit positions. In addition, the building blocks can be rotated or flipped to obtain the tiled building block constellation to meet the distance and/or power requirements.

So far, we have been discussing transmitting one or more bits of multiple channels simultaneously each interval. Let us consider the first embodiment that transmits two bits of channel 1 and two bits of channel 3 using the tiled building block constellation in FIG. 4. It is important to note that the two bits transmitted from each channel 1 (or 3) can actually come from two different users data streams. Hence, the constellation in FIG. 4 can actually serve either two or three four users. Similarly, the constellation shown in FIG. 8 can serve four or five users. In general, when a tiled building block constellation is used to transmit multiple channels during each interval, if any channel transmits multiple bits during each interval, those multiple bits can come from multiple users that are assigned to the same channel level. In the receiver(s), similar to the discussion of the demodulation and decoding aspects of FIG. 3 and FIG. 6, bit metrics would be computed for a given stream over a sub-frame, and these bit metrics would be sent to a decoder that is configured to decode based on the number of bits to be decoded in each sub-frame, e.g., 336 bits per sub-frame for a 4-QAM channel assuming single resource block assignment. In the case of 1D channels, an additional decoder would be needed to decode short bit stream of just 168 bits (one bit per symbol for 168 symbols per frame).

As discussed above, higher dimensional building blocks can also be used. For example, when the 4D building block discussed in U.S. Pat. No. 8,077,790 is used, then a single 2D constituent constellation of the building block will be placed at each tiling point of two consecutive 2D tiling constellations. It is also possible to select the tiling constellation to be a 4D or higher dimensional constellation. It can be noted that when higher dimensional signaling such as this is used, a fractional number of bits per interval can be transmitted. In general, the building block and/or the tiling constellation can be designed to have more than two dimensions, so that in general, all of the mi and /mj values can be positive fractional numbers (positive rational numbers) or positive integers. In such embodiments, modifications to the coding DSP sub layer (e.g., the encoder and decoder software modules themselves) will be needed in addition to the coding control sub layer.

Figure 9:
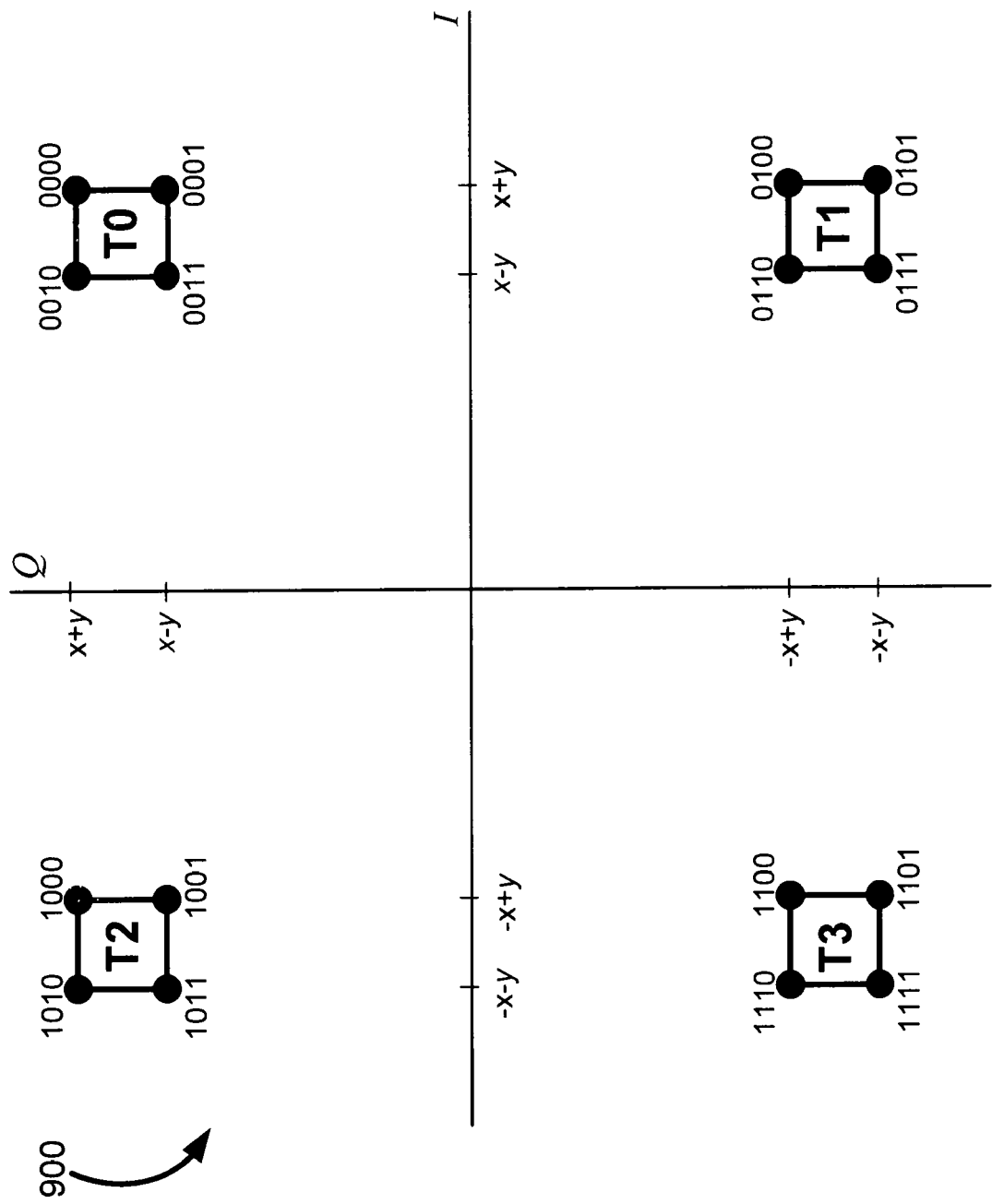
FIG. 9 shows a sparsely populated shared/multi-resolution 16-QAM constellation whose parameters are chosen to enforce a constant average power and MSED in the tile and building block coded constellations at their respective levels of resolution.

To further understand fixed selective mapping and its associated design techniques, consider an example with two (N=2) streams $d_1$ and $d_2$. Let $C_1$ be a 4-QAM constellation that employs constellation points formed using coordinates $\{+a,-a\}$ along each of the I and Q dimensions, and let $C_2$ be a 64-QAM constellation that employs constellation points formed using coordinates $\{\pm c, \pm 3c, \pm 5c, \pm 7c\}$ along each of the I and Q dimensions. Note that the average symbol energy of $C_1$ is $2a^2$ and the average energy of $C_2$ is $42c^2$. Therefore, in order to cause the constellations $C_1$ and $C_2$ to employ the same average energy, the condition $a^2=21c^2$ needs to be satisfied. Further, the MSED for the constellations $C_1$ and $C_2$ are $D_1^2=4a^2$ and $D_2^2=4c^2$. Therefore, $D_2^2/D_1^2=1/21$, which can be considered small enough to not cause significant performance degradations. Next select m2'=2 bits of stream $d_2$ to be transmitted along with m1=2 bits of stream $d_1$ each symbol interval using the constellation shown in FIG. 9. FIG. 9 first uses a 4-QAM constellation for $C_2'$ with coordinates $\{+y,-y\}$ along each of the I and Q dimensions to carry the two bits from the higher stream $d_2$. Four copies of the constellation $C_2'$ are placed at intersections of coordinates $\{+x,-x\}$ along each of the I and Q dimensions as tiles to form the resulting tiled-building-block coded constellation. The value of y is selected very close to c and the value of x, which is very close to a, is then chosen to maintain the same average energy according to $(x^2+y^2)=a^2=21c^2$. If powerful codes such as turbo codes are used in streams $d_1$ and $d_2$, then any degradation caused due to the use of the expanded multi-resolution constellation in FIG. 9 becomes negligible. FIG. 9 employs Gray coding of bits from $d_2$ within building blocks, and also Gray coding of bits of $d_1$ among the building block tiles.

Figure 10:
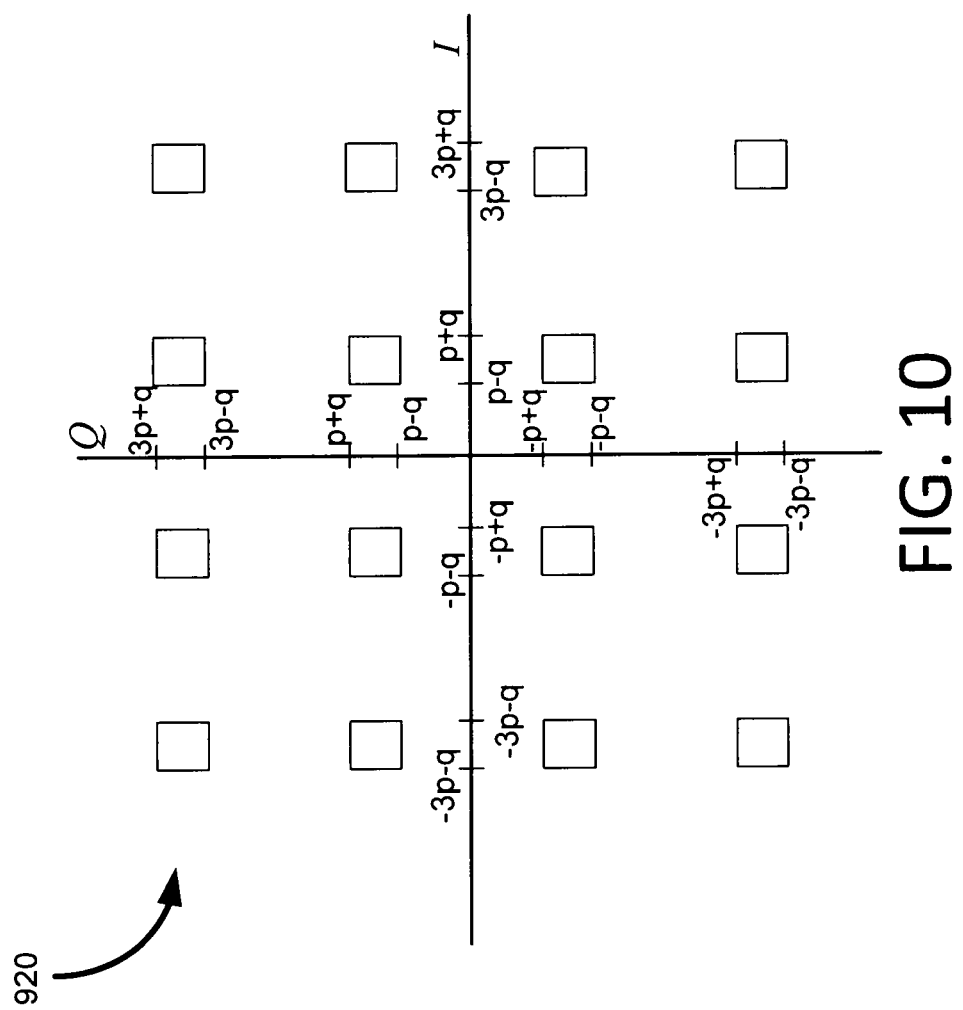
FIG. 10 shows a sparsely populated shared/multi-resolution 64-QAM constellation whose parameters are chosen to enforce a constant average power and MSED in the tile and building block coded constellations at their respective levels of resolution.

Next consider another example with two (N=2) streams $d_1$ and $d_2$. In this example, let $C_1$ be a 16-QAM constellation that employs constellation points formed using coordinates $\{\pm b, \pm 3b\}$ along each of the two dimensions, and let $C_2$ be a 256-QAM to constellation that employs constellation points formed using coordinates $\{\pm d, \pm 3d, \pm 5d, \pm 7d, \pm 9d, \pm 11d, \pm 13d, \pm 15d\}$ along each of the two dimensions. Note that the average symbol energy of $C_1$ is $10b^2$ and the average symbol energy of $C_2$ is $170d^2$. Therefore, $C_1$ and $C_2$ will both employ the same average energy when $b^2=17c^2$. Further, the MSED of the constellations $C_1$ and $C_2$ is $D_1^2=4b^2$ and $D_2^2=4d^2$ respectively. Therefore, $D_2^2/D_1^2=1/17$, which can again be considered small. In this example, two bits of stream $d_2$ can be transmitted along with four bits of stream $d_1$ using a constellation shown in FIG. 10. The SCMA approach in this example uses a QPSK constellation $C_2'$ with coordinates $\{+q,-q\}$ along each of the I and Q dimensions for the two bits from $d_2$ using Gray coding, and places sixteen copies of $C_2'$ at intersections $\{\pm p, \pm 3p\}$ along each of the I and Q dimensions as to represent four bits from stream $d_1$, also using Gray coding, to thereby form the tiled-building-block coded constellation as shown in FIG. 10. The value of q is selected to be close to d and the value of p, which is very close to b, is then chosen to maintain the same average energy according to $(5p^2+q^2)=5b^2=85c^2$. If powerful codes are used in streams $d_1$ and $d_2$ any degradation caused due to the use of the constellation in FIG. 10 becomes negligible.

Next consider how the embodiments discussed in connection with FIGS. 9 and 10 can be combined. Consider an embodiment that has N=4 parallel streams. In this embodiment, renumber the streams $d_1$ and $d_2$ of the embodiment of FIG. 9 as streams $d_1$ and $d_3$ respectively. Also, renumber the streams $d_1$ and $d_2$ of the embodiment of FIG. 10 as streams $d_2$ and $d_4$ respectively. The embodiment of FIG. 9 can be combined with the embodiment of FIG. 10 by transmitting two additional bits from stream $d_3$ along with two bits of stream $d_1$ by using a 16-QAM building block formed from four coded bits taken from stream $d_3$, and placing each such building block at each point of the 4-QAM tiling constellation formed from two coded bits taken from stream $d_1$. Alternatively, an embodiment can be constructed to transmit four additional bits of stream $d_4$ by changing the QPSK constellation $C_2'$ in the embodiment of FIG. 9 to a 16-QAM constellation formed using coordinates $\{\pm d, \pm 3d\}$ along each dimension, along with two bits of $d_1$. Alternatively, a combined embodiment can be formed that transmits two additional bits of stream $d_4$ along with four bits of stream $d_2$. In this kind of embodiment, the tiling constellation is 16-QAM and the building block is 4-QAM. Also, although these embodiments all correspond to 64-QAM tiled-building-block coded constellations, their constellation points can be placed, for example, to be sub-constellations of the 256-QAM constellation used in LTE.

In many embodiments, it is preferable to discretize the size of the building blocks and the locations of the tile centers to meet one or more specific practical requirements. For example, in the embodiment of FIG. 9, the values of a, bx, and y can be chosen to force the constellation points of FIG. 9 to coincide with the points of the constellation of FIG. 4 multiplied by the suitable power scaling factor. For example, the constellation points of FIG. 9 can be discretized to be placed on an underlying 64-QAM or 256-QAM constellation (high resolution/zoomed-in constellation as discussed above). The values of x and y can be chosen so that the resulting 16-QAM constellation in FIG. 9 would be formed using a subset of the constellation points of the 64-QAM or 256-QAM constellation. In the context of FIGS. 4 and 5, this was the approach taken, although the exact details of the power scale factor applied to the constellations was not discussed in detail until the discussions of FIG. 9 and FIG. 10.

In embodiments where enough streams are used so that the performance degradation is significant, coding rates of those degraded streams can optionally be adjusted to achieve the desired performance. For example, when the combined embodiment discussed above transmits four bits of stream $d_2$, instead of using two additional bits of stream $d_4$, two additional bits of stream $d_3$ can be used by adjusting the code rates of streams $d_2$ and $d_3$ to achieve the desired performance. Similarly, when the combined embodiment transmits two bits of stream $d_1$, instead of using two additional bits of $d_3$, two additional bits of stream $d_2$ and two additional bits of stream $d_3$ can be used by adjusting the code rates of streams $d_1$, $d_2$ and $d_3$ to achieve the desired performance. In such embodiments, modifications to the coding DSP sub layer will be needed in addition to just the coding control sub layer software.

The selective mapping and SCMA aspects of the present invention can also be applied in communication systems that do not involve OFDMA. For example, multimedia applications typically have different expected levels of performance for different types of signals, e.g., voice, video, and data. These expected levels of performance can be significantly different from each other. In such applications, SCMA can be used by forming building blocks using the bits of the stream that can allow higher error rates (smaller MSEDs) and defining the tiling constellation based upon the streams with lower error rates (higher MSEDs). In such applications, the shared/multi-resolution resource block does not necessarily support multi-user/multiple access functionality, but instead supports multi streaming of different streams with different error rate requirements. Instead of supporting multiple users, the shared/multi-resolution resource block can be used on a single-user OFDM channel or even on a single QAM type channel, for example.

Variable selective mapping in accordance with an aspect of the present invention is presented to send additional coded bits as compared with fixed selective mapping as described above. The aim is to send more bits per symbol while maintaining a specified level of performance. Variable selective mapping is most useful in applications like multimedia applications where a single receiver is used to receive and decode the multiple streams. In accordance with variable selective mapping, instead of using a sparsely populated constellation as shown in FIG. 4 or FIG. 5, the full set of constellation points of the underlying constellation such as the 64-QAM or the 256-QAM constellation can be sent during each symbol interval. For example, this allows six coded bits to be sent on the underlying 64-QAM constellation each symbol interval instead of just four as per the sparsely populated 16-QAM constellation of FIG. 4.

Figure 11:
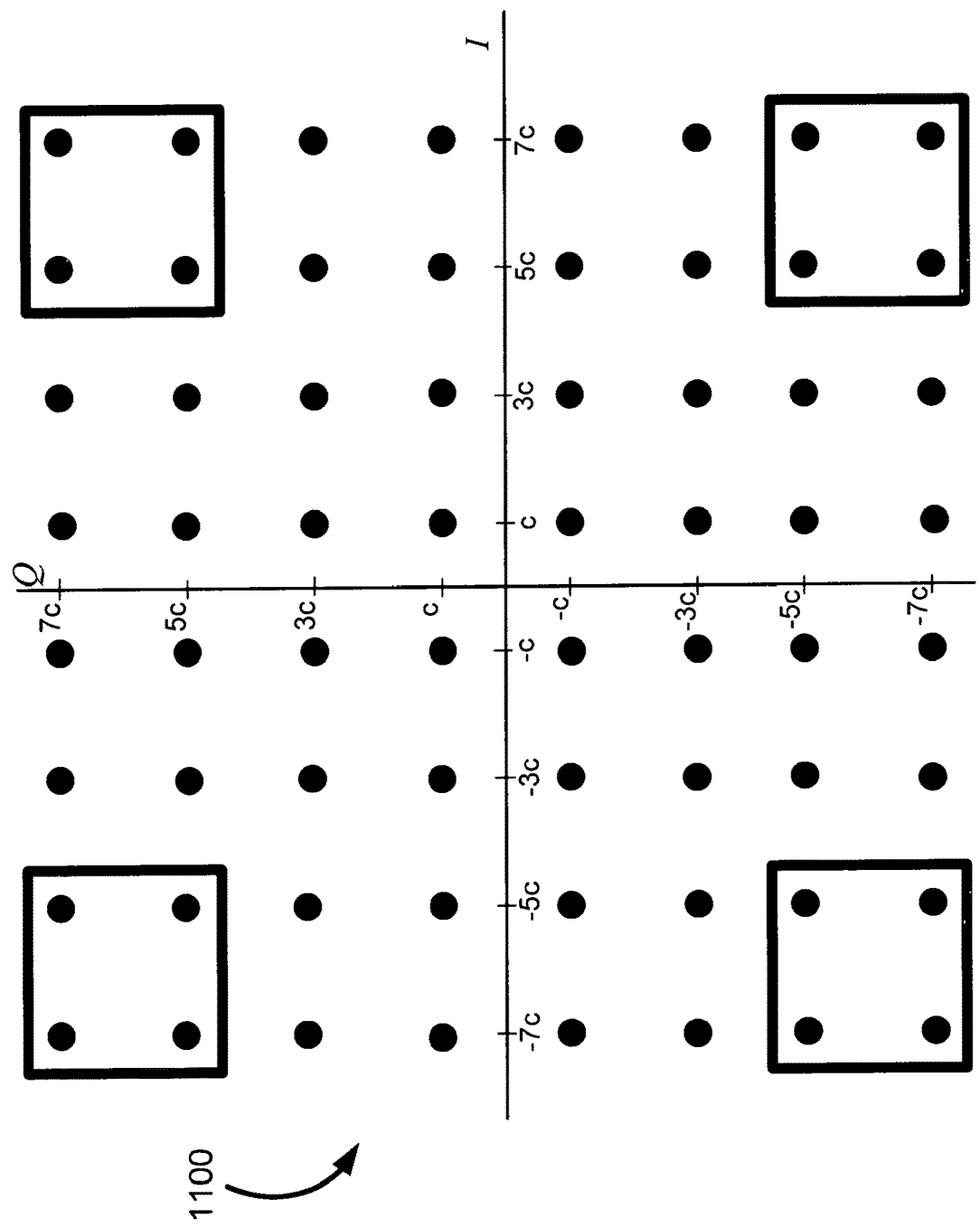
FIG. 11 shows a shared/multi-resolution 64-QAM constellation that includes four corner subsets that each contain four constellation points.
Figure 12:
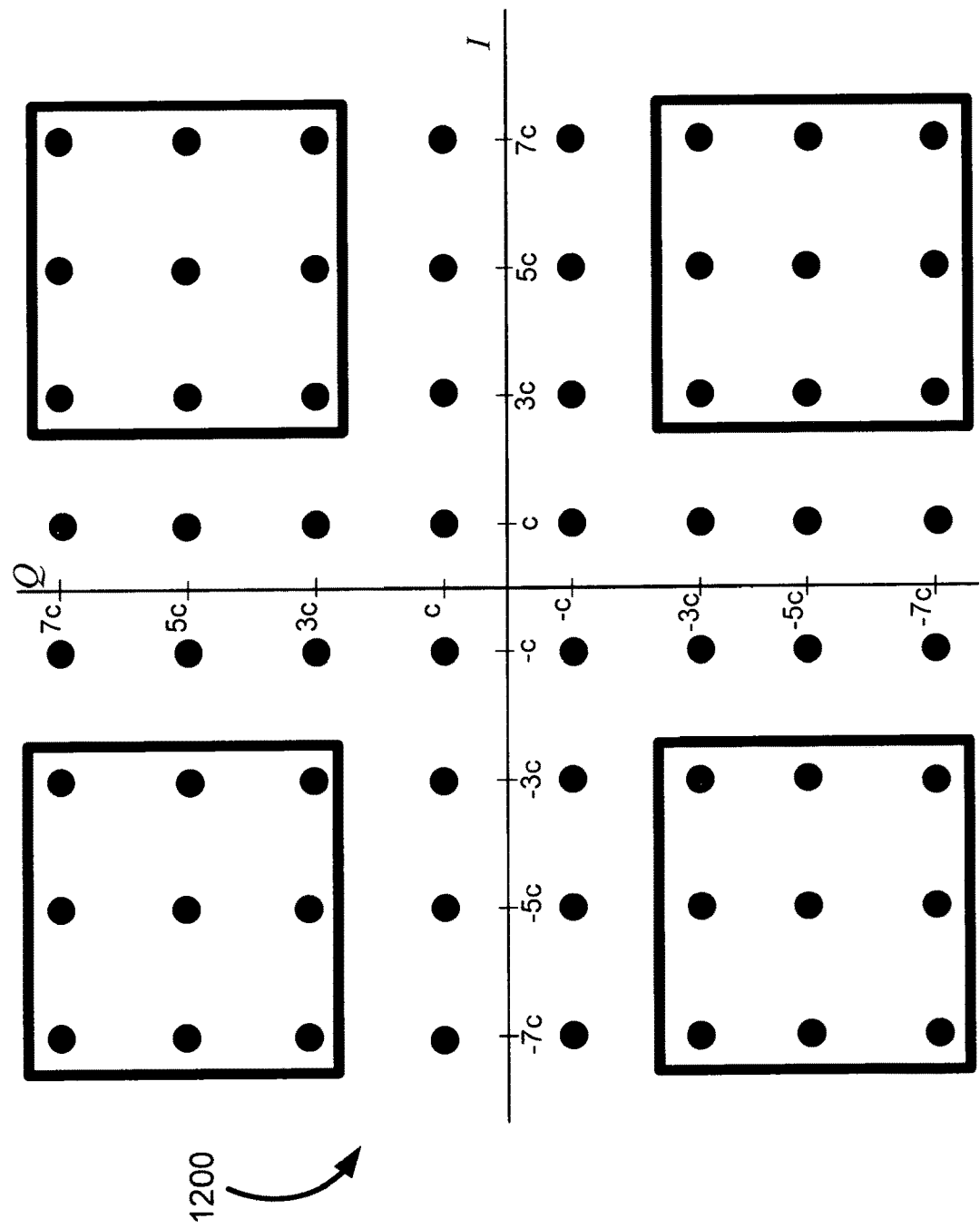
FIG. 12 shows a shared/multi-resolution 64-QAM constellation that includes four corner subsets that each contain nine constellation points.
Figure 13:
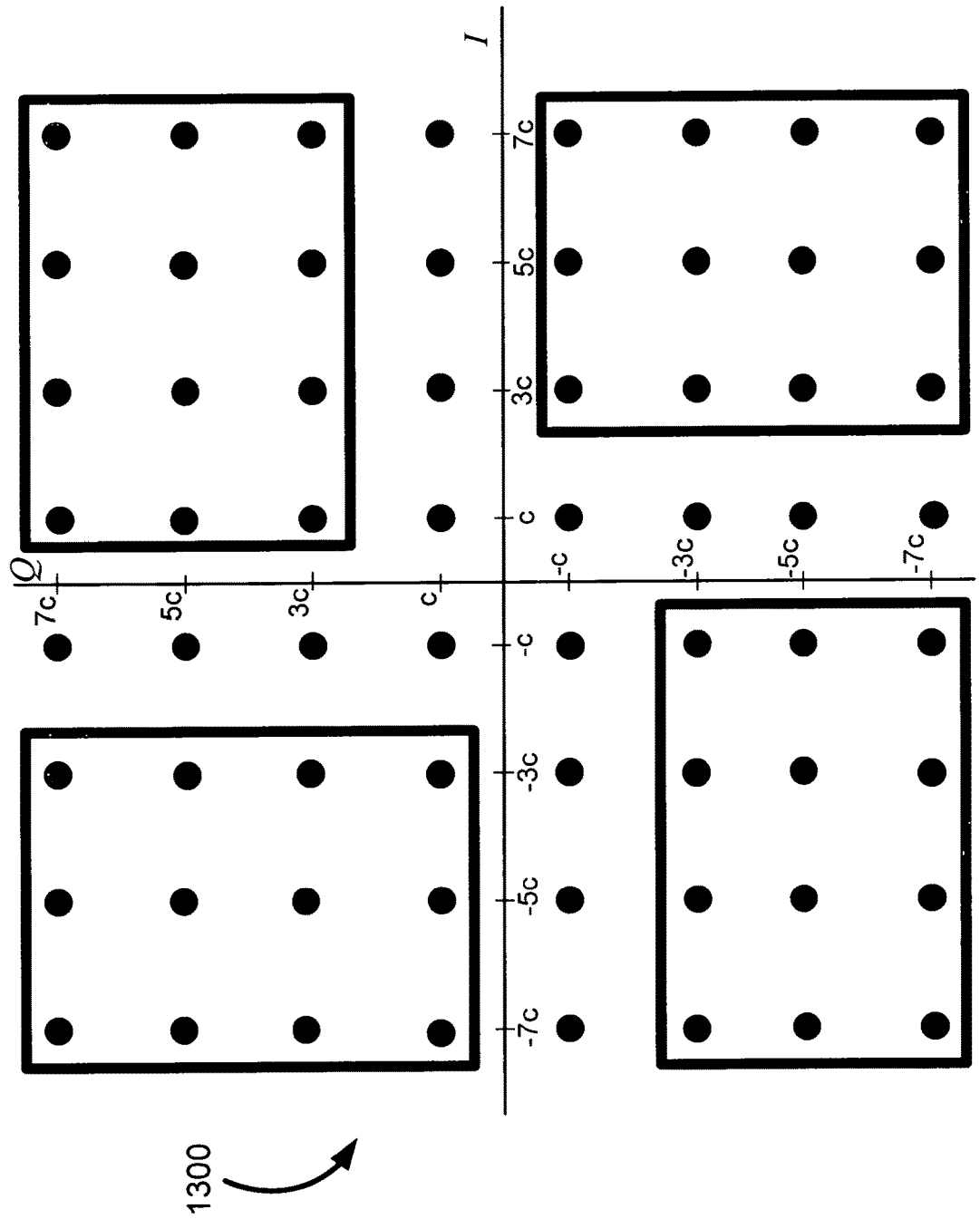
FIG. 13 shows a shared/multi-resolution 64-QAM constellation that includes four corner subsets that each contain twelve constellation points.

Referring to FIG. 11 consider a specific example involving the LTE 64-QAM constellation. In accordance with variable selective mapping, the 64-QAM constellation of FIG. 11 is partitioned to include four corner subsets which each contain four constellation points. FIG. 12 shows the same 64-QAM constellation, but this time it is partitioned to include four corner subsets which each contain nine constellation points. FIG. 13 again shows the same 64-QAM constellation, but this time it is partitioned to include four corner subsets which each contain twelve constellation points. In FIGS. 11-13, the minimum separation between the corner subsets depends on the number of points in each subset. Specifically, the minimum squared Euclidean distance between subsets in FIGS. 11, 12, and 13 is $100c^2$, $36c^2$ and $16c^2$ respectively.

Figure 14:
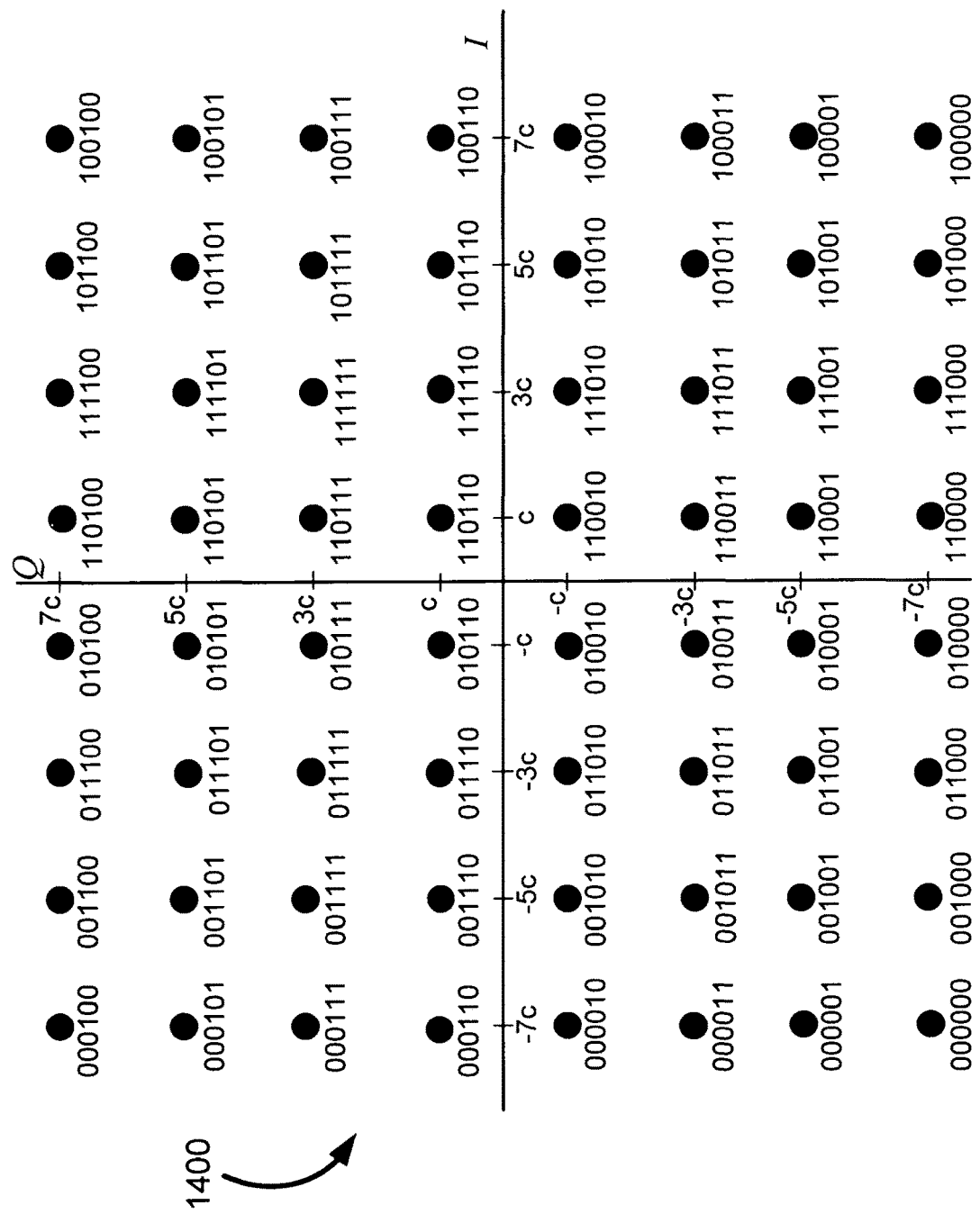
FIG. 14 shows the LTE 64-QAM constellation to include the Gray coded labeling of the constellation points.

Referring now to FIG. 14, the same LTE 64-QAM constellation used in the example discussed in connection with FIGS. 11-13 is shown with the constellation points labeled in accordance with the Gray coded mapping used in the LTE 64-QAM constellation. Note that when bit mapping is performed as shown in FIG. 14, the labels of all of the constellation points in all of the corner subsets shown in FIGS. 11, 12, and 13 will use the same labels in their second, third, fifth and sixth bits. More generally, the mapping/labeling is performed so that a subset of the bit labels are always the same in all of the corner subsets. Also, the labeling/mapping of FIG. 14 maintains Gray coding among all of the constellation points in each of the corner subsets of FIGS. 11-13. The two remaining bits (first and the fourth) are the same within each corner subset, and those two bits are varied according to Gray coding among the corner subsets. The remaining constellation points (those outside the corner subsets) also maintain Gray coding among all six bits. A similar example can be constructed, but where the underlying constellation is corresponds to the 256-QAM constellation. In FIGS. 11-13, the four corner boxes make up a "4-ary corner constellation," which is similar in construction and theory to a 4-ary tile constellation. Associated with the 4-ary corner constellation are all of the constellation points shown in the four corner boxes, i.e., there are 4×6=16 constellation points associated with the corner constellation of FIG. 11, 4×9=36 for FIG. 12, and 4×12=48 for FIG. 13. All of the constellation points not associated with the 4-ary corner constellation are called the "non-corner constellation", e.g., in FIG. 11 the non-corner constellation includes 64−16=48 constellation points, 64−36=28 constellation points in FIG. 12, and 64−48=16 constellation points in FIG. 13.

The constellation in FIGS. 11-13 can be used to transmit bits from both channel 1 (QPSK bits) associated with a lower stream $d_1$, and channel 3 (64-QAM bits) associated with a higher stream $d_2$. Here the bits of stream $d_1$ will correspond to corner subset selection and the bits of stream $d_2$ will selectively correspond to either 64-QAM constellation point selection or intra-corner-subset constellation point selection. As per FIGS. 11-14, Gray coding will be maintained among corner subsets for channel 1. For channel 3, Gray coding will be maintained among constellation points within the corner subsets and also among all of the constellation points of the entire 64-QAM constellation.

To better understand how variable selective mapping works, consider blocks of six coded bits taken for stream $d_2$ to be mapped to channel 3. Assuming the corner set partitioning of FIG. 11, during all symbol intervals, the $2^{nd}$, $3^{rd}$ $5^{th}$ and $6^{th}$ coded bits will be taken from stream $d_2$ and mapped to channel 3. If these four bits (the "control bits") point to a corner subset, then the two remaining bits ($1^{st}$ and $4^{th}$ bits) (the "variable-selected bits") will be taken from stream $d_1$ and mapped to channel 1 by selecting one of the four corner subsets. However, if the control bits do not point to a corner subset, the two variable-selected bits will instead be taken from stream $d_2$. This way, the four bits ($2^{nd}$, $3^{rd}$ $5^{th}$ and $6^{th}$) in each block of six coded bits from stream $d_2$ act as the control bits to help decide whether the two remaining (variable-selected) bits should come from stream $d_1$ or $d_2$. Since six bits are always sent irrespective of the values of the control bits, the above scheme is capable of transmitting six coded bits during all symbol intervals. Note that the bit labeling/mapping shown in FIG. 14 can be swapped/modified to have the four control bits correspond to LSB bits and to have the two variable-selected bits correspond to the MSB bits. This can be achieved explicitly or implicitly by swapping bits 2 and 4 in all combinations shown in FIG. 14.

While variable selective mapping allows all of the bits associated with the underlying constellation to be sent each interval, there will be uncertainty at the receiver as to whether the variable-selected bits came from stream $d_1$ or $d_2$. One way to resolve this uncertainty is to transmit, for example in a frame header, one additional bit associated with each symbol in the frame to indicate whether the two variable-selected bits came from stream $d_1$ or $d_2$. However, this lowers the net throughput from six bits per symbol interval down to five. Still, this is a 25% improvement as compared to the throughput of FIG. 4. Another way to resolve this uncertainty is to start decoding channel 3 as a punctured code (every six bits from stream $d_2$ punctured to four bits) using the bit metrics associated with the four control bits of every symbol. Once the soft information associated with the channel 3 bits emerges, the uncertainty about origin of the variable-selected bits can be resolved in a soft manner. Soft information can be used to indicate the probabilities that the variable-selected bits came from coded bit stream $d_1$ or $d_2$. The decoder can then run iterations until the most likely decoding solution emerges for both streams $d_1$ and $d_2$ for the current frame. That is, soft decoding is used in determining whether the control bits indicated stream $d_1$ or $d_2$ for each symbol interval in the frame. Optionally or additionally, a CRC can also be used on the four control bits to verify the decision of the four control bits. Some embodiments can instead use hard decoding of the control bits to resolve the uncertainty.

In addition, the rate at which the bits are transmitted from stream $d_1$ differs from that of fixed selective mapping such as shown in FIG. 4. In FIG. 4, every interval is guaranteed to transmit two coded bits from stream $d_1$ and two coded bits from stream $d_2$ each symbol interval. However, the above-described variable selective mapping transmits two coded bits from stream $d_1$ only if the control bits point to the corner subsets. Assuming all bit combinations of control bits are equiprobable, channel 1 bits associated with stream $d_1$ are transmitted only with probability ¼, 9/16 and ¾ in FIGS. 11-13 respectively. Hence, on average, channel 1 transmits 0.5, 1.125 and 1.5 coded bits per interval and channel 3 transmits 5.5, 4.875 and 4.5 coded bits per interval in FIGS. 11-13 respectively. Note that the expected squared Euclidian distance in channel 1 is $4\alpha^2=84c^2$. Therefore, the constellation as partitioned in FIG. 11, which has a minimum squared Euclidian distance of $100c^2$, is guaranteed to perform better than the normal expected performance of channel 1. Similarly, the worst case squared distance suggests that the configuration in FIG. 12 performs about 3.5 dB worse when compared with the expected performance of channel 1 and that of FIG. 13 suffers about 7 dB loss from the expected performance of channel 1. However, since there many other higher squared Euclidian distances that can also occur in FIGS. 12 and 13, their actual performance can be close to that of the expected performance of channel 1. As demonstrated by FIGS. 11-13, variable selective mapping allows a tradeoff between the performance and the bit rate of channel 1 while maintaining the same performance of channel 3 and transmitting a total of six coded bits every interval.

Variable selective mapping can be generalized to a general $2^m$-ary constellation to transmit bits from streams $d_1$ through $d_N$ using respective selective mapping channels 1, . . . , N. In this general technique, a $2^m$-ary underlying constellation is used to transmit up to m bits from stream $d_N$ into channel N. Let m=(ma+mb), where mb corresponds to the number of control bits taken from every block of m bits from stream $d_N$. However, the ma variable-selected bits can come from one of the streams $d_1, \ldots, d_N$, depending on the mb control bit combination selected in that block of m coded bits from stream $d_N$. In order to achieve this transmission the constellation and mapping needs to satisfy the following properties or their equivalents: (a) the constellation is partitioned into subsets $A_{ij}$, j=1,2, . . . , (N−1), i=1,2 . . . , $2^{ma}$, j=1,2, . . . , (N−1), (b) for any given j, the same distinct combinations of mb control bit combinations are employed in each subset $A_{ij}$, i=1,2, . . . , $2^{ma}$, (c) Gray coding is used among the distinct combinations of control bits within subsets, (d) for any given j, Gray coding is used for the ma selected bits among the subsets $A_{ij}$, i=1,2, . . . , $2^{ma}$, and (e) Gray coding is used among all m bits outside the collection of subsets $A_{ij}$, i=1,2, . . . , $2^{ma}$, j=1,2, . . . , (N−1). If desired, ma and mb can be made dependent on j to transmit different numbers of bits from different channels.

Fixed and variable selective mappings can also be used to construct other types of communication systems. For example, in OFDMA systems such as 4G and 5G LTE where MIMO (multiple input multiple output) is employed with multiple transmit and/or receive antennas, spatial multiplexing and multi-user MIMO configurations are in common use or are in development. It is to be understood that fixed and variable selective mapping can be applied to form SCMA embodiments that employ MIMO techniques and use multiple transmitters to transmit the same or different symbol streams to be sent to one or multiple users via the downlink. MIMO systems can be used with spatial diversity by using space time codes or (space frequency codes depending on the application) for improving performance of a data stream. MIMO systems can also be used for spatial multiplexing to increase the throughput by transmitting multiple data streams. SCMA embodiments that inherently transmit multiple data streams can be used in MIMO systems with spatial diversity and/or spatial multiplexing. SCMA can be used individually with either with spatial diversity or spatial multiplexing. The present invention also contemplates embodiments that use spatial diversity for one stream category 1 (like channel 1) and use spatial multiplexing to transmit multiple streams of a different category (like channel 3). In such systems, fixed or variable selective mapping can be used to form symbols that selectively include different bits from different respective streams associated with different users, different antennas, and/or different streams such as application layer streams such as multimedia applications, and/or lower layer control streams for system control functions.

Figure 15:
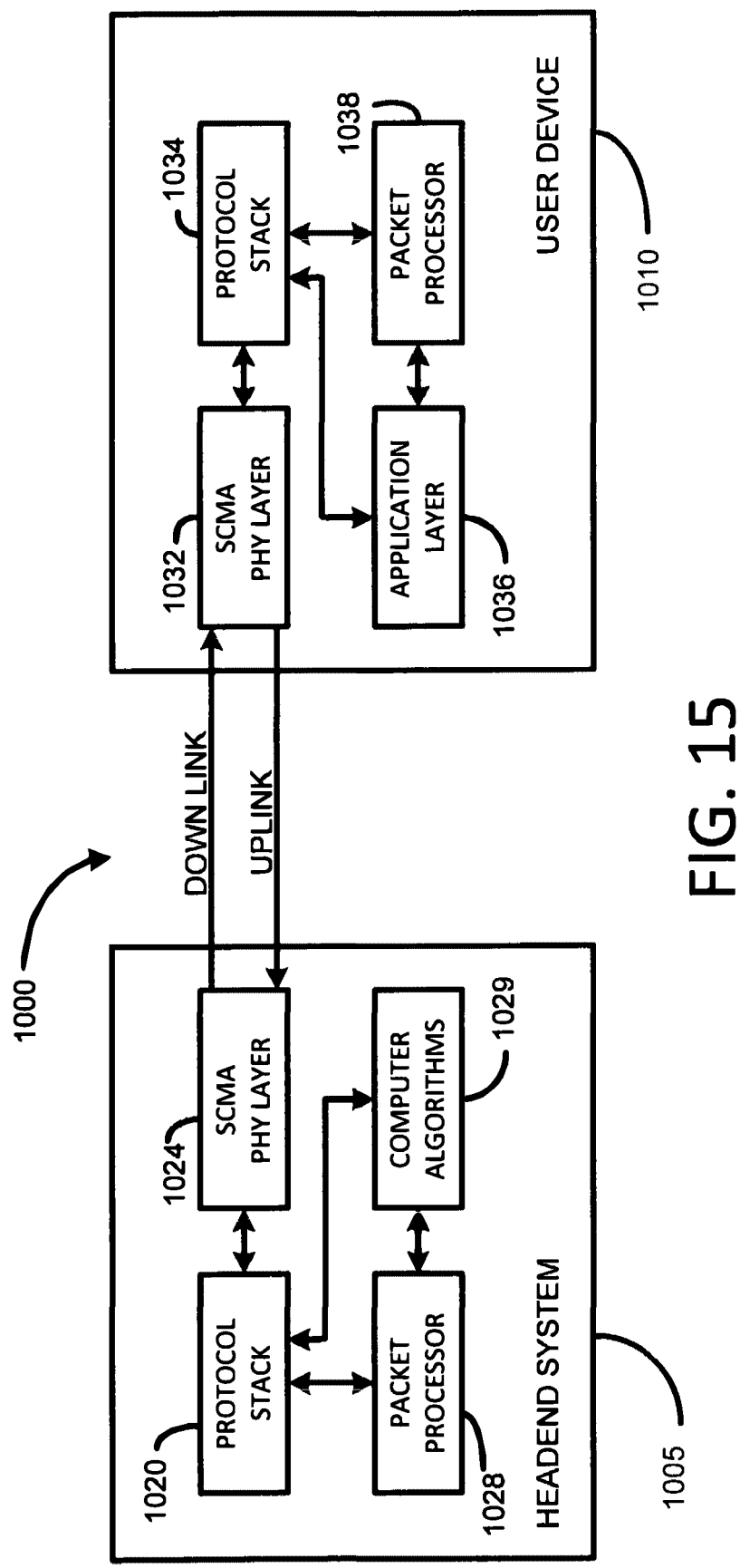
FIG. 15 is a block diagram representing an exemplary uplink/downlink type communication system used to implement a communication system and/or a communication protocol to provide a layered protocol structure using the tiled building block trellis code techniques of the present invention in the physical layer.

FIG. 15 shows an example systems architecture 1000 into which any of the SCMA techniques described herein may be used. A headend system 1005 transmits via a downlink channel to user device 1010. In this patent application, the term "headend" generally refers to any base station or network based equipment that is used to communicate with one or more user devices. The term "headend" is commonly used with cable modems and cable TV to indicate the cable network station that communicates with either cable TV sets or cable modems. Herein the term "headend" can refer to cable modem network equipment, or cable TV network equipment such as digital TV broadcast equipment, but also LTE and WiFi type OFDMA base stations, and any other such communications equipment that communicates with one or more user devices using a shared downlink. The user device 1010 transmits back to the headend system 1005 via an uplink channel. The headend system comprises a protocol stack 1020 which includes a physical layer 1024. The headend system also may include a control and routing module 1028 to connect to external networks, databases, and the like. The headend system also contains a computer control module 1029 which comprises processing power coupled to memory. The computer control module 1029 preferably implements any maintenance functions, service provisioning and resource allocation, auto-configuration, software patch downloading and protocol version software downloads, billing, local databases, web page interfaces, upper layer protocol support, subscriber records, and the like.

The user terminal 1010 (e.g., an LTE and/or WiFi compatible "mobile unit") similarly includes a physical layer interface 1032, a protocol stack 1034 and an application layer module 1036 which may include user interface devices as well as application software. The user terminal 1010 also may optionally include a packet processor 1038 which can be connected to a local area network, for example. The user 1010 terminal may also act as an IP switching node or router in addition to user functions in some embodiments.

Both the headend 1005 and the user device 1010 are usually implemented with digital processing logic which includes one or more processors coupled to respective memories and/or shared memories. Aspects of the present invention are typically implemented by placing sequences of instructions into certain ones of the memories. For example, a first processor may interact with a control channel and work at configuring the system in accordance with information in or associated with a resource block. This processor operates at a coding control sub layer. The encoder and decoder operate at a DSP coding sub layer. For example, items at this sub layer include signal mapper, bit metrics computations, and iterative or non-iterative decoding software modules. Signal conditioning may also be optionally employed in this sub layer. Although the present invention involves software, the present invention is actually implemented as a method, a process, or as system or apparatus. For example, once hardware 1005 or 1010 is designed and implemented with the appropriate software, the system 1000 and the apparatus 1005 and 1010 result.

Another type of embodiment replaces the headend system 1005 with another user device 1010 in which case direct peer-to-peer communications is enabled. In many applications, though, the headend can act as an intermediary between two user devices to enable indirect peer-to-peer communications using the same headend-to/from-user device uplink/downlink architecture illustrated in FIG. 15.

In preferred embodiments of the present invention, at least one of the uplink and the downlink channels is augmented by using SCMA as per the present invention in the coder and decoder pair. In some types of embodiments, the PHYS 1024, 1032 may include echo cancellation, cross-talk cancellation, equalization, and other forms of signal conditioning or receiver pre-processing. In many applications, the SCMA aspects of the present invention will be applied in an OFDMA or cable modem downlink from the headend 1005 to a plurality of mobile units or cable modems configured similarly to the user device 1010. In most envisioned embodiments the uplink will not use SCMA.

It can be noted that SCMA can be applied in uplinks especially in conjunction with close proximity peer-to-peer communications. For example, a mobile device can use the building block spacing or the underlying constellation spacing to communicate with a close proximity peer, and can simultaneously use the tile or corner subset 4-QAM constellation for communicating with a more far away base station. Another place where SCMA can be deployed is in systems that support WiFi-LTE coexistence. WiFi is usually short rage and LTE/LTE-U is longer rage. As a result WiFi signals are stronger (like channel 3) & LTE/LTE-U are signals are weaker (like channel 1). In such situations SCMA can transmit bits jointly to have building blocks formed by WiFi bits and tiles formed by LTE bits. That is, SCMA can be used to combine both technologies, WiFi & LTE/LTE-U.

Similarly, the protocol stack may preferably include in its link layer scrambling, interleaving, and forward error correction coding (channel coding, e.g., Reed-Solomon, block codes, convolutional codes, and turbo codes). The headend may include the optional packet switching node and/or router 1028, for example using an Internet Protocol (IP) packet forwarding policy. External databases connected via the router 1028 thereby provide remote services to the subscriber terminal via the headend. Similarly, local databases holding more specific types of data may be saved in computerized storage areas and processed using the computerized module 1029.

In one type of embodiment, the headend system may be a cellular communications base station that carries mobile data, such as IP packet traffic. In other embodiments, the headend may be a wireless metropolitan area network (e.g., WiMax), a local area network base station or personal area network base station, respectively, for WiFi and Bluetooth type applications. In other types of applications, the headend system 1005 may correspond to a cable services headend system and the user device 1010 may be a cable modem. In other types of applications, the head end system 1005 may correspond to a DSL services head end system and the user device 1010 may be a DSL modem. In such applications the user device may also have a router function and connect to a home or office network, or any other type of network, for example.

Although the present invention has been described with reference to specific embodiments, other embodiments may occur to those skilled in the art without deviating from the intended scope. For example, while tiled building block coded constellations are discussed throughout, in general, different types of multilevel codes with different types of codes used at various coding levels could be used in SCMA systems. In these more general embodiments, the upper coding levels can be viewed as the distant view/low resolution constellation for the first mobile unit with the weak channel and the lower coding levels can be viewed as the zoomed in/high resolution constellation for the second mobile unit with the strong channel. In general more than two mobile units can access different coding levels of a received multilevel coded constellation. Similarly, while most discussions indicated certain constellations would be sent each symbol interval, such expanded multilevel constellations could be sent, for example, during only a subset of the 168 symbol intervals per resource block. Also, while block diagrams are provided herein, it should be noted that any of the blocks described herein could be implemented in hardware using programmable or custom logic, or in software running on one or more processors. Also, the blocks in different figures can be mixed and augmented in any way with blocks of any other figures to arrive at other contemplated embodiments, and any of the blocks can be modified in accordance with described alternative embodiments. While most discussion focused on OFDMA and multi-user systems, certain aspects of the present invention can also be applied in multi-resolution single user links that use OFDM or even a single QAM constellation or some other kind of modulation such as code division multiple access (CDMA). Hence it is to be understood that these general families of embodiments are contemplated and that the invention is to be limited only by the scope and spirit of the appended claims.

What is claimed is:

1. A method for use in a communications apparatus of a multiuser communication system, the method comprising:
encoding a first sequence of bits from a first bit stream to form a first sequence of encoded bits;
encoding a second sequence of bits from a second bit stream to form a second sequence of encoded bits;
mapping a first set of bits from the first sequence of encoded bits into a shared resource element;
mapping a second set of bits from the second sequence of encoded bits into the shared resource element; and
transmitting a resource block containing the shared resource element via a multiuser communication channel;
wherein the shared resource element is transmitted in the resource block as a shared multi-resolution signal constellation, the first set of bits is to be received by a mobile unit and the second set of bits is to be received by a base station node.

2. The method of claim 1, wherein the transmitting makes use of an orthogonal frequency division multiplexed multiple access (OFDMA) physical layer, wherein the OFDMA physical layer comprises one or more of (1) a downlink channel, (2) an uplink channel, or (3) a peer-to-peer communications capability.

3. The method of claim 2, wherein the peer-to-peer communications capability enables the communications apparatus to directly communicate with a peer communications apparatus.

4. The method of claim 3, wherein the peer communications apparatus corresponds to the base station node, and both the communications apparatus and the base station node comprises base station nodes of a metropolitan area network.

5. The method of claim 4, wherein the communications apparatus further includes an internet protocol (IP) switching node, the method further comprising:
switching, at an IP layer, a plurality of separate data streams to cause the data streams to be directed to destination mobile units along their paths via a selected sequence of remote base station nodes within the metropolitan area network.

6. The method of claim 3, wherein the communications apparatus further includes a multiple input multiple output (MIMO) antenna system, the method further comprising:
causing the shared resource element to be transmitted along a first spatial beam pointed in a direction of the mobile unit and a second spatial beam pointed in a direction of the base station node.

7. The method of claim 1, wherein the communications apparatus comprises a base station node of a metropolitan area network.

8. The method of claim 7, wherein the communications apparatus further includes an internet protocol (IP) switching node, the method further comprising:
switching, at an IP layer, a plurality of separate data streams to assist data to traverse the metropolitan area network.

9. The method of claim 1, wherein at least one of the first sequence of encoded bits and the second sequence of encoded bits are encoded, at least in part, by a low density parity check (LDPC) code.

10. The method of claim 1, wherein the shared resource element is transmitted using a shared constellation that is a member of a group consisting of a 16-QAM constellation, a 64-QAM constellation, and a 256-QAM constellation.

11. A communications apparatus for use in a multiuser communication system, the apparatus comprising:
an encoder configured to encode a first sequence of bits from a first bit stream to form a first sequence of encoded bits, and to encode a second sequence of bits from a second bit stream to form a second sequence of encoded bits;
a bit mapper that maps a first set of bits from the first sequence of encoded bits and a second set of bits from the second sequence of encoded bits into a shared resource element, that is represented as a shared multi-resolution signal constellation; and
a transmitter configured to transmit a resource block containing the shared resource element via a multiuser communication channel;
wherein the first set of bits is to be received by a first base station node and the second set of bits is to be received by a second base station node.

12. The communications apparatus of claim 11, wherein the transmitter makes use of an orthogonal frequency division multiplexed multiple access (OFDMA) physical layer, wherein the OFDMA physical layer comprises one or more of (1) a downlink channel, (2) an uplink channel, or (3) a peer-to-peer communications capability.

13. The communications apparatus of claim 12, wherein the peer-to-peer communications capability enables the communications apparatus to directly communicate with a peer communications apparatus.

14. The communications apparatus of claim 13, wherein the communications apparatus comprises a base station node of a metropolitan area network.

15. The communications apparatus of claim 14, further comprising:
an internet protocol (IP) switching node that is configured to switch, at an IP layer, a plurality of separate data streams to cause the data streams to be directed to destination mobile units along their paths via a selected sequence of remote base station nodes within the metropolitan area network.

16. The communications apparatus of claim 13, further comprising:
a multiple input multiple output (MIMO) antenna system that causes the shared resource element to be transmitted along a first spatial beam pointed in a direction of the first base station node and a second spatial beam pointed in a direction of the second base station node.

17. The communications apparatus of claim 11, further comprising:
a base station node of a metropolitan area network.

18. The communications apparatus of claim 17, further comprising:
an internet protocol (IP) switching node that is configured to switch, at an IP layer, a plurality of separate data streams to assist data to traverse the metropolitan area network.

19. The communications apparatus of claim 11, wherein at least one of the first sequence of encoded bits and the second sequence of encoded bits are encoded, at least in part, by a low density parity check (LDPC) code.

20. The communications apparatus of claim 11, wherein the shared resource element is transmitted using a shared constellation that is a member of a group consisting of a 16-QAM constellation, a 64-QAM constellation, and a 256-QAM constellation.

* * * * *